United States Patent
Saavedra

(10) Patent No.: US 9,426,029 B2
(45) Date of Patent: Aug. 23, 2016

(54) SYSTEM, APPARATUS AND METHOD FOR PROVIDING IMPROVED PERFORMANCE OF AGGREGATED/BONDED NETWORK CONNECTIONS WITH CLOUD PROVISIONING

(71) Applicant: TELOIP INC., Mississauga (CA)

(72) Inventor: Patricio Humberto Saavedra, Toronto (CA)

(73) Assignee: TELOIP INC., Mississauga (CA)

( * ) Notice: Subject to any disclaimer, the term of this patent is extended or adjusted under 35 U.S.C. 154(b) by 0 days.

(21) Appl. No.: 14/638,267

(22) Filed: Mar. 4, 2015

(65) Prior Publication Data
US 2015/0244580 A1   Aug. 27, 2015

Related U.S. Application Data

(63) Continuation-in-part of application No. 13/958,009, filed on Aug. 2, 2013, which is a continuation-in-part of application No. 13/420,938, filed on Mar. 15, 2012, now Pat. No. 8,913,610, which is a continuation of application No. 12/269,439, filed on Nov. 12, 2008, now Pat. No. 8,155,158.

(51) Int. Cl.
*H04L 12/24* (2006.01)
*H04L 12/26* (2006.01)
*H04L 12/28* (2006.01)
(Continued)

(52) U.S. Cl.
CPC ........ *H04L 41/0816* (2013.01); *H04L 12/2867* (2013.01); *H04L 43/04* (2013.01); *H04L 43/08* (2013.01); *H04L 45/245* (2013.01);
(Continued)

(58) Field of Classification Search
CPC ..... H04L 41/0816; H04L 43/08; H04L 43/04; H04L 69/14; H04L 2012/5624; H04L 12/2867; H04L 45/245; Y02B 60/33
See application file for complete search history.

(56) References Cited

U.S. PATENT DOCUMENTS

| 5,617,417 A | 4/1997 | Sathe et al. |
| 5,764,740 A | 6/1998 | Holender |

(Continued)

FOREIGN PATENT DOCUMENTS

| CN | 1897492 A | 1/2007 |
| EP | 0910195 A2 | 4/1999 |

(Continued)

OTHER PUBLICATIONS

Mushroom Networks, Inc.; Mushroom Networks; http://www.mushroomnetworks.com/product.aspx?product_id=1000 &tab=features; p. 1-2; 2004-2008.
Internet Engineering Task Force; The PPP Multilink Protocol; http://www.ietf.org/rfc/rfc1990.txt?number=1990; Aug. 1, 1996.
(Continued)

*Primary Examiner* — Kim T Nguyen
(74) *Attorney, Agent, or Firm* — Norton Rose Fulbright Canada LLP; Maya Medeiros

(57) ABSTRACT

A network system for improving network communication performance is disclosed. The system includes 1) at least one network bonding/aggregation computer system that includes: (i) at least one client site network component bonding or aggregating one or more diverse network connections; and (ii) at least one network server component configured to interoperate with the client site network component; and 2) a cloud based network manager that includes: a data collection utility, a network performance analysis utility, and a network configuration utility.

34 Claims, 37 Drawing Sheets

(51) Int. Cl.
*H04L 12/709* (2013.01)
*H04L 29/06* (2006.01)
*H04L 12/70* (2013.01)

(52) U.S. Cl.
CPC ........ *H04L 69/14* (2013.01); *H04L 2012/5624* (2013.01); *Y02B 60/33* (2013.01)

(56) References Cited

U.S. PATENT DOCUMENTS

| | | | |
|---|---|---|---|
| 5,809,070 | A | 9/1998 | Krishnan et al. |
| 6,002,670 | A | 12/1999 | Rahman et al. |
| 6,262,976 | B1 | 7/2001 | McNamara |
| 6,621,859 | B1 | 9/2003 | Bell et al. |
| 6,778,495 | B1 | 8/2004 | Blair |
| 7,167,860 | B1 | 1/2007 | Black et al. |
| 7,177,284 | B2 | 2/2007 | Peleg et al. |
| 7,630,412 | B2 * | 12/2009 | Wright ............... H04L 25/14 370/352 |
| 7,646,708 | B2 | 1/2010 | McGee et al. |
| 7,805,156 | B1 * | 9/2010 | Allen ................... H04W 76/02 370/329 |
| 7,843,843 | B1 | 11/2010 | Papp, III et al. |
| 8,155,158 | B2 | 4/2012 | Saavedra |
| 2002/0114276 | A1 | 8/2002 | Basturk |
| 2004/0213386 | A1 | 10/2004 | Gupta |
| 2005/0027870 | A1 | 2/2005 | Trebes, Jr. |
| 2005/0030974 | A1 | 2/2005 | Wright et al. |
| 2006/0098573 | A1 | 5/2006 | Beer et al. |
| 2006/0176900 | A1 | 8/2006 | Liu et al. |
| 2006/0215689 | A1 | 9/2006 | Liu et al. |
| 2008/0075111 | A1 | 3/2008 | Hu et al. |
| 2008/0080371 | A1 | 4/2008 | Liu et al. |
| 2009/0182874 | A1 | 7/2009 | Morford et al. |
| 2010/0046525 | A1 | 2/2010 | Wright et al. |
| 2010/0046536 | A1 | 2/2010 | Wright et al. |
| 2011/0013569 | A1 * | 1/2011 | Scherzer ............... H04W 48/14 370/329 |
| 2011/0081955 | A1 | 4/2011 | Lange et al. |
| 2013/0064255 | A1 | 3/2013 | Saavedra |
| 2015/0003465 | A1 | 1/2015 | Saavedra |

FOREIGN PATENT DOCUMENTS

| | | |
|---|---|---|
| WO | 2004/043013 A1 | 5/2004 |
| WO | 2006095273 A1 | 9/2006 |
| WO | 2006100610 A1 | 9/2006 |
| WO | 2010/054475 A1 | 5/2010 |
| WO | 2014/135216 A1 | 9/2014 |

OTHER PUBLICATIONS

Patent Cooperation Treaty, International Search Report and Written Opinion dated May 27, 2015 for PCT Application No. PCT/CA2014/000694.
IP Australia, Notice of Acceptance dated Aug. 6, 2015 issued in Australian application No. 2009316197.
IP Australia, Office Action dated Jun. 17, 2015 issued in related Australian application No. 2014295861.
United States Patent & Trademark Office, Office Action dated Jul. 2, 2015 issued in related U.S. Appl. No. 14/489,036.
United States Patent & Trademark Office, Office Action dated Jul. 1, 2015 issued in related U.S. Appl. No. 13/958,009.
United States Patent and Trademark Office, Office Action Summary dated Jul. 19, 2013, issued on U.S. Appl. No. 13/420,938.
Norton Rose Fulbright Canada LLP, Office Action Response dated Oct. 21, 2013, filed on U.S. Appl. No. 13/420,938.
United States Patent and Trademark Office, Office Action Summary dated Apr. 9, 2010, issued on U.S. Appl. No. 12/269,439.
Miller Thomson LLP, Office Action Response dated Sep. 30, 2010, filed on U.S. Appl. No. 12/269,439.
United States Patent and Trademark Office, Office Action Summary dated Dec. 7, 2010, issued on U.S. Appl. No. 12/269,439.
Miller Thomson LLP, Office Action Response dated Jun. 7, 2011, filed on U.S. Appl. No. 12/269,439.
United States Patent and Trademark Office, Office Action Summary dated Jun. 23, 2011, issued on U.S. Appl. No. 12/269,439.
Miller Thomson LLP, Office Action Response dated Nov. 10, 2011, filed on U.S. Appl. No. 12/269,439.
IP Australia, Office Action dated Jul. 25, 2014, issued on Australian Patent Application No. 2009316197.
Patent Cooperation Treaty, Written Opinion and International Search Report dated Oct. 17, 2014, issued on PCT Application No. PCT/CA2014/000595.
Canadian Intellectual Property Office, Office Action dated Apr. 14, 2014, issued on Canadian Patent Application No. 2,743,548.
State Intellectual Property Office, Office Action dated Aug. 23, 2013, issued on Chinese Patent Application No. 200980149872.1 (english translation provided).
State Intellectual Property Office, Office Action dated Apr. 30, 2014, issued on Chinese Patent Application No. 200980149872.1 (english translation provided).
European Patent Office, Extended European Search Report dated Jan. 3, 2013, issued on European Patent Application No. 09825684.5.
United States Patent and Trademark Office, Office Action Summary dated Apr. 29, 2014, issued on U.S. Appl. No. 13/420,938.
United States Patent and Trademark Office, Office Action Summary dated Jun. 27, 2014, issued on U.S. Appl. No. 13/420,938.

* cited by examiner

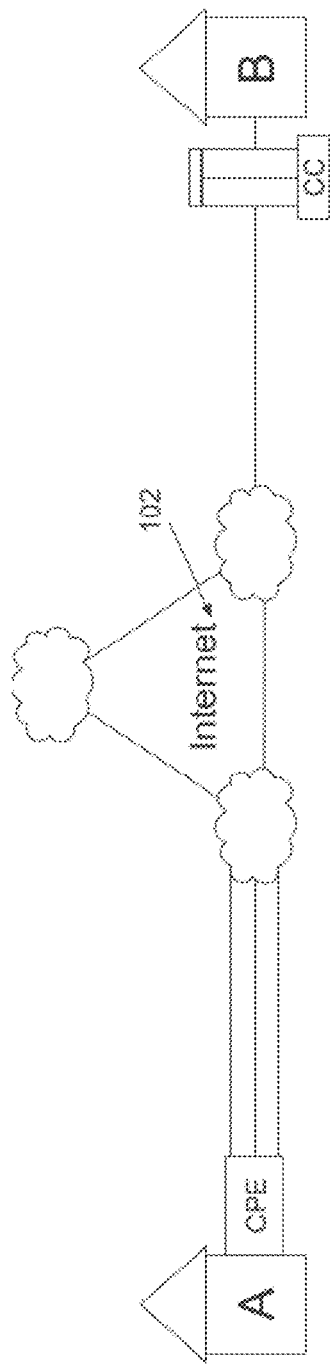
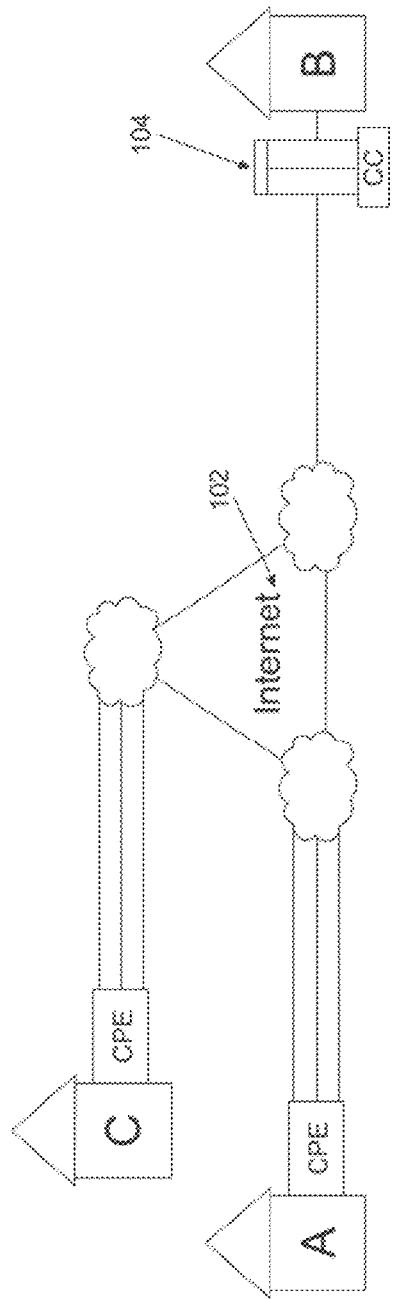
FIG. 1A
(PRIOR ART)
FIG. 1B
(PRIOR ART)

FIG. 10C

SYSTEM, APPARATUS AND METHOD FOR
PROVIDING IMPROVED PERFORMANCE OF
AGGREGATED/BONDED NETWORK
CONNECTIONS WITH CLOUD
PROVISIONING

CROSS-REFERENCE TO RELATED APPLICATIONS

This application is a continuation-in-part of U.S. patent application Ser. No. 13/958,009 filed on Aug. 2, 2013, which is a continuation-in-part of U.S. patent application Ser. No. 13/420,938, filed on Mar. 15, 2012, which is a continuation of U.S. patent application Ser. No. 12/269,439, filed on Nov. 12, 2008, all of which are hereby incorporated by reference.

FIELD

This disclosure relates generally to network communications and, in particular, to aggregating or bonding communications links to improve network performance or quality of services for a variety of different networks including wired and wireless networks, and including Wide Area Networks ("WAN").

BACKGROUND

While capacity of network connections has increased since the introduction of dial up, high speed connectivity is not ubiquitous in all regions. Also, bandwidth is not an unlimited resource and there is a need for solutions that improve the utilization of bandwidth and that also address network performance issues.

Various solutions exist for improving network performance such as load balancing, bonding of links to increase throughput, as well as aggregation of links. In regards to bonding/aggregation, various different technologies exist that allow two or more diverse links (which in this disclosure refers to links associated with different types of networks and/or different network carriers) to be associated with one another for carrying network traffic (such as a set of packets) across such associated links to improve network performance in relation for such packets.

Examples of such technologies include load balancing, WAN optimization, or ANA™ technology of TELoIP, as well as WAN aggregation technologies.

Many of such technologies for improving network performance are used to improve network performance between two or more locations (for example Location A, Location B, Location N or the "Locations"), where bonding/aggregation of links is provided at one or more of such locations. While the bonded/aggregated links provide significant network performance improvement over the connections available to carry network traffic for example from Location A to an access point to the backbone of a network (whether an Internet access point, or access point to another data network such as a private data network or high performance wireless network) ("network backbone"), the bonded/aggregated links are generally slower than the network backbone.

Prior art technologies including bonding/aggregation generally result in what is often referred to as "long haul" bonding/aggregation, which means that the bonded/aggregated links are maintained for example from Location A and Location B, including across the network backbone, which in many cases results in network impedance. As a result, while bonding/aggregation provides improved network performance for example from Location A to the network backbone, network performance across the entire network path, for example, from Location A to Location B, may be less than optimal because the technology in this case does not take full advantage of the network performance of the network backbone.

Furthermore, prior art systems are generally set up on trial and error, ignoring the fact that networks are dynamic and can be constantly varying in speed, data traffic volume, signal strength, and so on. There is no apparent solution in the prior art designed to monitor or address the varying network performance variables of both a bonded connection and a network path carried over a high performing network bone.

There is a need for a system and method that addresses at least some of these problems, or at least an alternative.

SUMMARY

In an aspect, there is disclosed a network system for improving network communication performance between at least a first client site and a second client site, the first client site and the second client site being at a distance from one another that would usually require long haul network communication. The system may include: 1) at least one network bonding/aggregation computer system including: (i) at least one client site network component that is implemented at least at the first client site, the client site network component bonding or aggregating one or more diverse network connections to configure a bonded/aggregated connection that has increased throughput; and (ii) at least one network server component, configured to interoperate with the client site network component, the network server component including a server/concentrator that is implemented at an access point to a high performing network interconnected with the second client site; and 2) a cloud based network manager comprising: (i) a data collection utility configured to collect network performance data from a variety of sources or network points in real-time or near real-time; (ii) a network performance analysis utility configured to dynamically analyze the collected network performance data in real-time or near real-time; and (iii) a network configuration utility configured to reconfigure at least one of: the at least one client site network component, the at least one network server component, the one or more diverse network connections, and the bonded/aggregated connection based on the analyzed network performance data.

In another aspect, the cloud based network manager may include an electronic portal configured to display at least one of: the collected network performance data and an analysis output of the network performance analysis utility.

In another aspect, the network performance analysis utility may generate data required to modify network paths in the long haul network connections between the first client site and the second client site.

In yet another aspect, the network performance analysis utility may determine a network performance score based on the network performance data.

In a further aspect, the network performance score may be a Quality of Experience score.

In another aspect, the Quality of Experience score may be determined based one at least one of: Mean Opinion Score (MOS) standard, latency, jitter and loss.

In one aspect, the data collection utility may be configured to collect at least one of: Simple Network Management Protocol (SNMP) data, Netflow data, IP traffic data, on-device statistics from the client site network component, on-device statistics from the network server component, device configuration data, and log data.

In another aspect, the client site network component and the network server component may be configured to interoperate to generate and maintain a network overlay for managing network communications between the first client site and the access point; and between the client site network component and the network server component data traffic is carried over the bonded/aggregated connection, and between the access point and the second client site the network server component terminates the bonded/aggregated connection and passes the data traffic to the high performing network.

In yet another aspect, the network configuration utility may be configured to control the network overlay to reconfigure one or more network server components or one or more network paths.

In another aspect, the network configuration utility may be configured to reconfigure a managed network path comprising the bonded/aggregated connection and at least one network path carried over the high performing network.

In a further aspect, the network configuration utility may be configured to store the collected network performance data in at least one electronic data store.

In another aspect, the network configuration utility may be configured to automatically provision one or more network devices between the first client site and the second client site.

In yet another aspect, the network configuration utility may be configured to automatically reconfigure the client site network component to: (a) collect the network performance data; and (b) initiate the configuration of a network overlay to include one or more network server components to improve network performance.

In an aspect, the network configuration utility may be configured to apply predictive analytics to facilitate reconfiguration.

In another aspect, the predictive analytics may comprise pattern recognition and machine learning techniques.

In yet another aspect, the network performance analysis utility may automatically generate rules for responding to network performance issues.

In another aspect, the network performance analysis utility may be configured to detect network attacks or network vulnerabilities.

In a further aspect, there is disclosed a computer-implemented method for improving network communication performance between at least a first client site and a second client site, the first client site and the second client site being at a distance from one another that would usually require long haul network communication. The method may include: 1) configuring, by at least one client site network component that is implemented at least at the first client site, a bonded/aggregated connection by bonding or aggregating one or more diverse network connections, the at least one client site network component configured to interoperate with at least one network server component, the network server component including a server/concentrator that is implemented at an access point to a high performing network interconnected with the second client site; 2) collecting network performance data from a variety of sources or network points in real-time or near real-time by a data collection utility of a cloud based network manager; 3) dynamically analyzing the collected network performance data in real-time or near real-time by a network performance analysis utility of the cloud based network manager; and 4) reconfiguring at least one of: the at least one client site network component, the at least one network server component, the one or more diverse network connections, and the bonded/aggregated connection based on the analyzed network performance data by a network configuration utility of the cloud based network manager.

In another aspect, the method may include displaying, by an electronic portal of the cloud based network manager, at least one of: the collected network performance data and an analysis output of the network performance analysis utility of the network system.

In another aspect, the method may include generating, by the network performance analysis utility, data required to modify network paths in the long haul network connections between the first client site and the second client site.

In yet another aspect, the method may include determining, by the network performance analysis utility, a network performance score based on the network performance data.

In a further aspect, the network performance score may be a Quality of Experience score.

In another aspect, the method may include collecting, by the data collection utility, at least one of: Simple Network Management Protocol (SNMP) data, Netflow data, IP traffic data, on-device statistics from the client site network component, on-device statistics from the network server component, device configuration data, and log data.

In another aspect, the client site network component and the network server component may be configured to interoperate to generate and maintain a network overlay for managing network communications between the first client site and the access point, wherein between the client site network component and the network server component data traffic is carried over the bonded/aggregated connection, and between the access point and the second client site the network server component terminates the bonded/aggregated connection and passes the data traffic to the high performing network.

In yet another aspect, the method may include controlling, by the network configuration utility, the network overlay to reconfigure one or more network server components or one or more network paths.

In yet a further aspect, the method may include reconfiguring, by the network configuration utility, a managed network path comprising the bonded/aggregated connection and at least one network path carried over the high performing network.

In another aspect, the method may include storing, by the data collection utility, the collected network performance data in at least one electronic data store.

In another aspect, the method may include automatically provisioning, by the network configuration utility, one or more network devices between the first client site and the second client site.

In yet another aspect, the method may include automatically reconfiguring, by the network configuration utility, the client site network component to: 1) collect the network performance data; and 2) initiate the configuration of a network overlay to include one or more network server components to improve network performance.

In an aspect, the method may include applying, by the network configuration utility, predictive analytics to facilitate reconfiguration.

In another aspect, the predictive analytics may comprise pattern recognition and machine learning techniques.

In another aspect, the method may include comprising automatically generating rules for responding to network performance issues by the network performance analysis utility.

In yet another aspect, the method may include detecting network attacks or network vulnerabilities by the network performance analysis utility.

In this respect, before explaining at least one embodiment in detail, it is to be understood that the embodiment is not limited in its application to the details of construction and to the arrangements of the components set forth in the following description or illustrated in the drawings. Embodiments are capable of being practiced and carried out in various ways. Also, it is to be understood that the phraseology and terminology employed herein are for the purpose of description and should not be regarded as limiting.

BRIEF DESCRIPTION OF THE DRAWINGS

Examples of embodiments of the invention will now be described in greater detail with reference to the accompanying drawings, in which:

FIG. 1A illustrates a prior art network configuration that includes a bonded/aggregated network connection, and illustrates the problem of long haul aggregation/bonding.

FIG. 1B also illustrates a prior art network configuration that includes central management of bonded/aggregated network connections, which also shows the problem of long-haul aggregation/bonding with multiple customer sites.

Figure 10C:
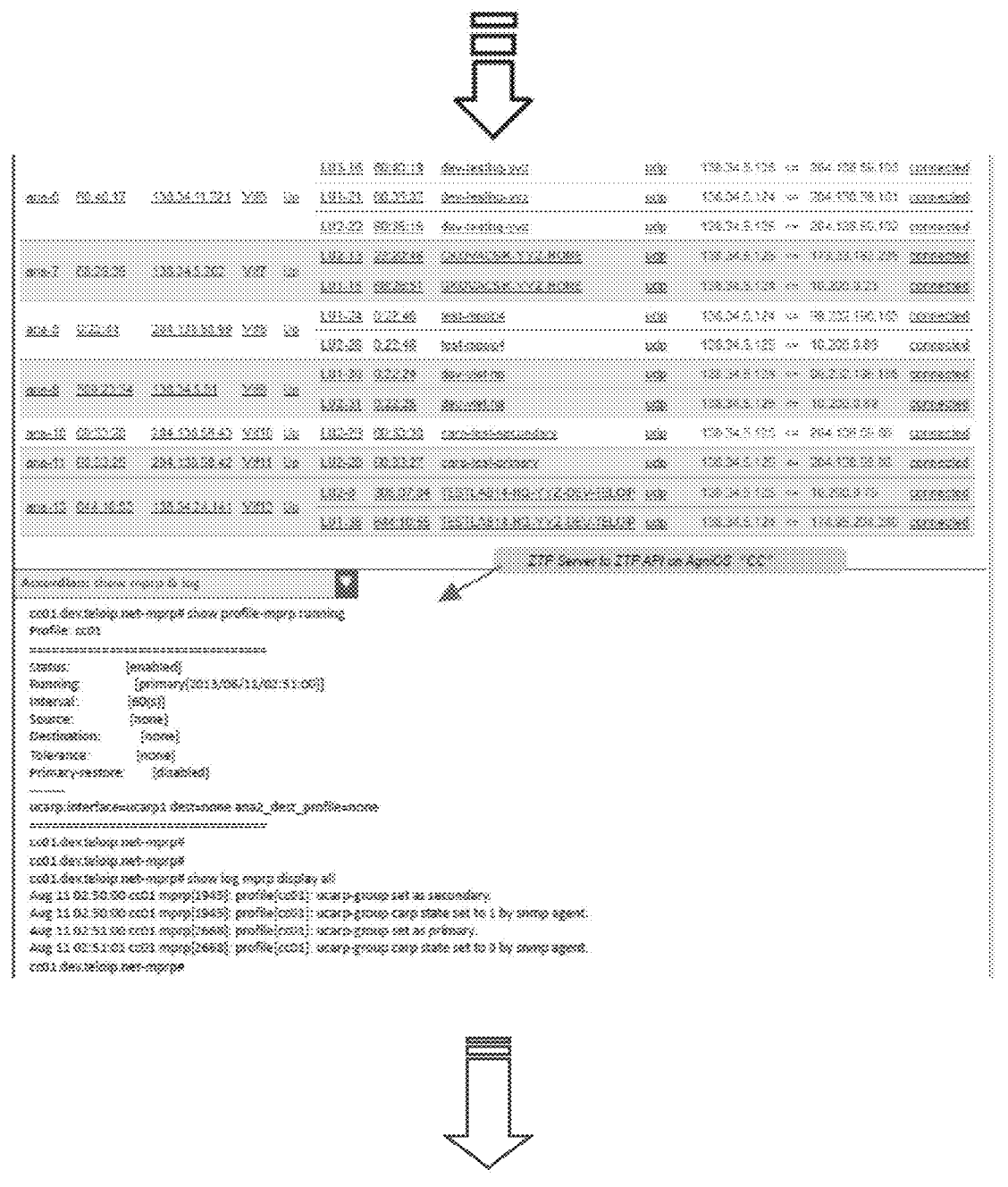

FIG. 10C illustrates a third portion of a Cloud Concentrator Dashboard interface shown on a Portal as provided by a Cloud Based Network Manager, exemplary of an embodiment.

DETAILED DESCRIPTION

Figure 2A:
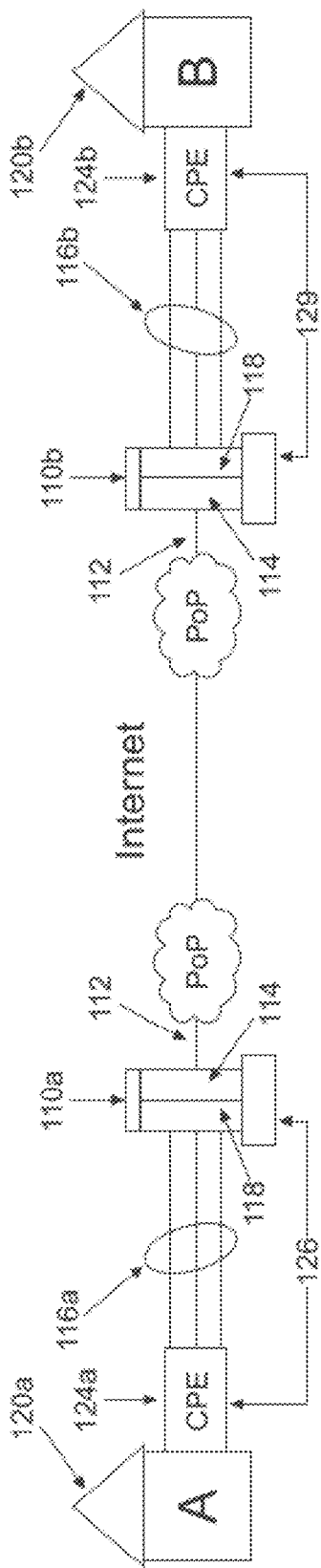
FIG. 2A shows a network solution with bonding/aggregation implemented at both Site A and Site B, while minimizing long haul effects, exemplary of an embodiment.

Systems, network architectures, and networking methods are provided.

In an aspect, a network solution is provided for improving network communication performance between at least two sites, where the two sites are at a distance from one another that would usually require long haul network communication. The network solutions include at least one network bonding/aggregation system that includes (A) at least one first network component that is implemented at a first service site, the first network component being configured to bond or aggregate one or more diverse network connections so as to configure a bonded/aggregated connection that has increased throughput; and (B) a second network component, configured to interoperate with the first network component, the second network component including a server/concentrator (also referred to as network server component) that is implemented at an access point to a high performing network backbone.

In an aspect, the first network component may be implemented using what is referred to in this disclosure a "CPE" or customer premises equipment (also referred to as client site network component). The CPE and a server/concentrator component (more fully described below) interoperate to configure the bonded/aggregated connections in order to provide improve network connections at a site associated with the CPE. A CPE may be referred to as a client site network component, where a server/concentrator may be referred to as a cloud concentrator (CC) or a network server component.

In an aspect, the server/concentrator is implemented at an access point, with access to the network backbone (e.g. a high performing network 112) so as to avoid long-haul bonded/aggregated network communications. As set out in the Example in Operation cited below, network architectures that involve long-haul bonded/aggregated network communication result in less than optimal performance, thereby minimizing the advantages of the bonding/aggregation technology. In other words, while the bonding/aggregation technology may improve service to Site A associated with for example a CPE (or equivalent), based on bonding/aggregation between the CPE and an associated server/concentrator (or equivalent), overall performance may be less than desired and in fact may be less than what would be available without bonding/aggregation because of the long haul effects of carrying the bonded/aggregation from Site A, to at least Site B. These long haul effects may be present wherever Site A and at least Site B are at a substantial distance from one another.

In addition, the server/concentrator may be implemented as a cloud service, a cluster service or simply a cluster hosted in cloud, or a router server configured based on certain configurations. It may also be referred to as a cluster or a cloud concentrator ("CC") throughout this application. The clusters or cloud concentrators may serve multiple CPEs. A client site may have multiple CPEs and a cluster can serve multiple client sites. The clusters or cloud concentrators ("CC") may also communicate with one another on a basis of multiple points-of-presence ("Multi-POP"), as will be described below.

In an embodiment (not illustrated), the server/concentrator (or network server component) may be remotely or closely coupled with one or more CPEs, and may be implemented by software components, hardware components, or a combination of both software and hardware components. The server/concentrator may be implemented to one or more server computers, or may be implemented as an interconnected network of computers residing at the same or different physical locations, and connected to one or more CPEs and the core network (e.g. MPLS) through one or more trusted network connections. The server/concentrator can interoperate with CPEs and/or the other components in the network architecture in order to deliver the functionalities described herein.

The Example in Operation below illustrates the decrease in performance that results from the long haul effects.

FIG. 1A illustrates the problem of long haul aggregation/bonding generally. In the prior art bonded/aggregated network communication shown in FIG. 1A, packets are carried over the Internet through an extension of the bonded/aggregated connection across the Internet (102), rather than a high performing Internet. The bonded/aggregated connection, across a distance that is subject to long haul effects, will not perform as well as the Internet, thereby providing less than ideal performance.

The Example in Operation reflects another problem with prior art bonding/aggregation solutions, namely that they generally require control or management by a central server. Depending on the location of the central server, this can result in multiplying the long haul effects because traffic between Site A and Site B may also need to be transferred to a Site C that is associated with the central server. This aspect is illustrated for example in FIG. 1B. Central server (104) manages network communications, and in fact routes network communications between Site A and Site C. To the extent that the distance between central server (104) is substantial from either of Site A or Site C, long haul effects will present. If central server (104) is at a substantial distance from each of Site A and Site C, then there will be a multiplying of the long haul effects, as network traffic will pass from Site A to the central server (104) to Site C, and from Site C to the central server (104) to Site A.

As illustrated in the Example of Operation, long haul effects have a negative impact on speed (slowing traffic) and also on latency. Conversely, an embodiment may provide significant improvements in regards to both speed and latency.

Embodiments disclosed herein may provide a network solution, including a networking system and architecture and associated networking method, may address the aforesaid long haul effects that have a negative effect on performance.

As shown in FIG. 2A, in an aspect, the server/concentrator side of a bonding/aggregation network solution for Site A (120a) is implemented such that (A) the location of the server/concentrator is implemented with access to the network backbone of Internet (112), and (B) the server/concentrator (110a) includes functionality for (i) receiving packets by means of the bonded/aggregated connection (116a), (ii) interrupting the bonded/aggregated connection (116a) using an interruptor (118), and (iii) directing the packets (114) to the Internet (112) for delivery to a Site B (120b). If Site B also has bonded/aggregated network service, then the packets are delivered to a Site B side server/concentrator (110b). Server/concentrator (110b) established a further bonded/aggregated connection (116b) and directs the packets (114) via the bonded/aggregated connection (116b) to a CPE (B) (124b) at Site B.

Figure 2B:
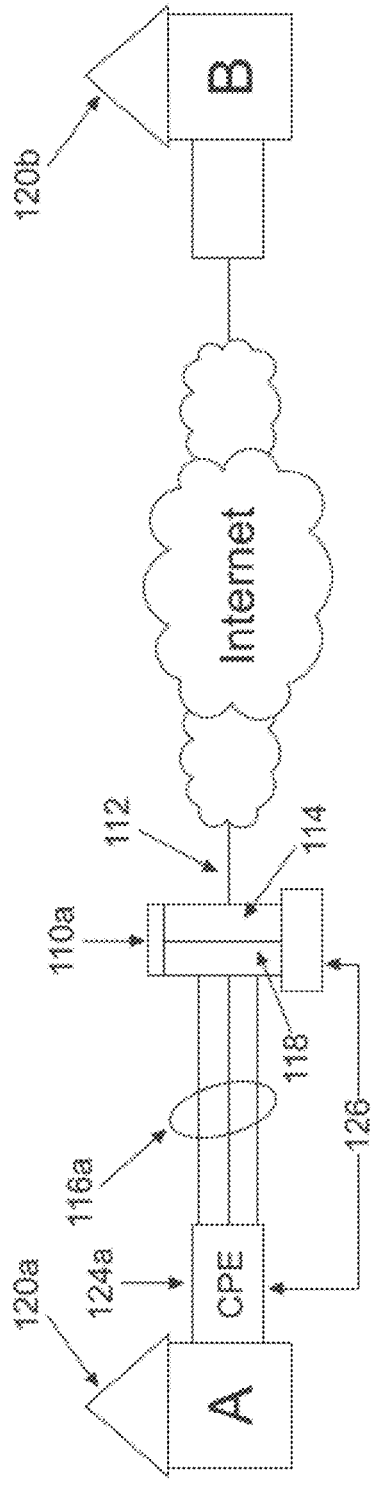
FIG. 2B shows another network solution, in which bonded/aggregated network service exists at Site A but not at Site B, exemplary of an embodiment.

FIG. 2B illustrates a configuration where bonded/aggregated network service exists at Site A but not at Site B.

Figure 2C:
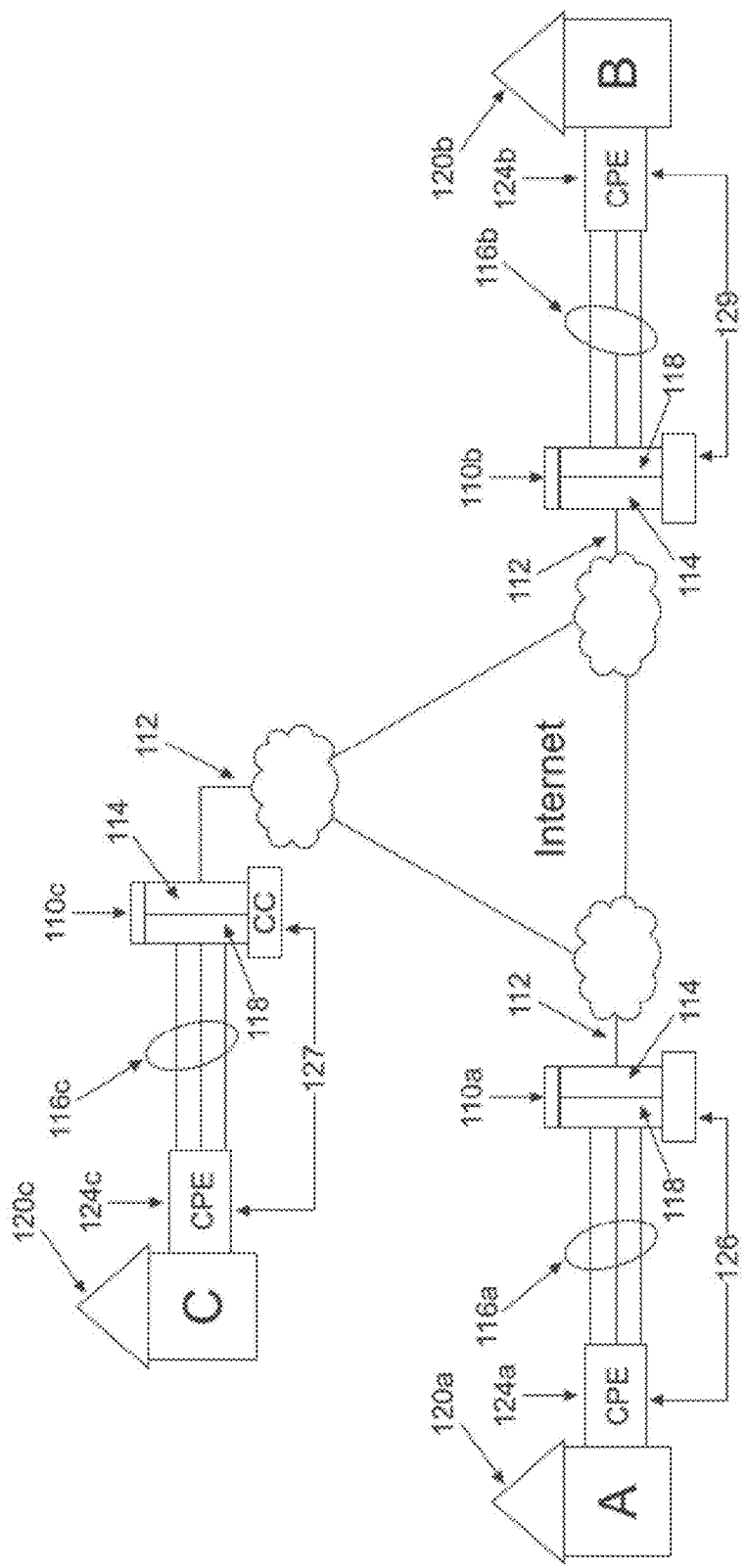
FIG. 2C shows still another network solution in which bonding/aggregation is implemented as between Site A, Site B, and Site C, exemplary of an embodiment.

More than two sites are possible, where the network system of example embodiments improves network performance for network communications between for example Site A, Site B, and Site C where one or more sites will include bonded/ aggregated service. In an example embodiment, as shown in FIG. 2C, bonded/aggregated service is present for each of Site A, Site B and Site C. FIG. 2C illustrates one possible implementation, where the network system is based on a distributed network architecture where server/concentrators (110*a*) (110*b*) (110*c*) and corresponding CPEs (124*a*) (124*b*) (124*c*) are configured to provide improved network communications, including interruption of network communications at the network backbone so as to reduce long haul effects, dynamically and on a peer to peer basis without the need for a persistent central manager. In one implementation, each of the network components of the network system included functionality to operate on a peer to peer basis.

A CPE (124) initiates network communications on a bonded/aggregated basis, cooperating with a server/concentrator (110), with packets destined for a remote location. Each server/concentrator (110) receives dynamic updates including a location and identifier associated with other server/concentrators (110). Packets are dynamically sent to a server/concentrator (110) at the remote location, if available, and from the server/concentrator (110) at the remote location to its CPE (124). The CPEs (124) and their server/concentrators (110) use bi-directional control of network communications to establish a network overlay to provide improved network performance. The network overlay for example provides desirable quality of service despite underlying network conditions that may otherwise resulted in a decrease in network performance.

In accordance with an embodiment, the network system may establish and manage two or more network overlays. Referring for example to FIG. 2*a*, a first network overlay (126) is established between the CPE(A) (124*a*) and server/concentrator (110*a*); then, communications are transferred over the Internet (112) without a network overlay; then, a second network overlay (129) is established between server/concentrator (110*b*) and CPE(B) (124*b*). As a result, IP transport is provided between Site A and Site B where this will provide better performance than the aggregated/bonded network connections. Bonding/aggregation in effect is distributed across the locations, rather than attempting to span the distance between the locations with end to end bonding/aggregation.

Embodiments disclosed herein therefore may provide distributed bonding/aggregation. Embodiments disclosed herein may also provide a network system that automatically provides distributed bonding/aggregation in a way that bonding/aggregation is proximal, and beyond proximal connections IP transport is used, with proximal bonded/aggregated connections and fast Internet being used as part of end-to-end improved service.

In some embodiment, a distribute proximal aggregation model for the network may be implemented. For example, a plurality of Concentrators or CCs may be established in multiple locations covering a multitude of Proximal Aggregation points which may be referred to as Home-POPs. Each CC can support multi-tenant configurations used for multiple clients associated with different CPEs to improve network performance for such multiple clients by providing termination of their ANA service and transfer of communications to the network backbone/Internet. The network solution can include multiple Points-of-Presence, distributed geographically to bridge disparate areas with improved network communication using proximal aggregation to each customer link-aggregation CPE device.

Figure 2D:
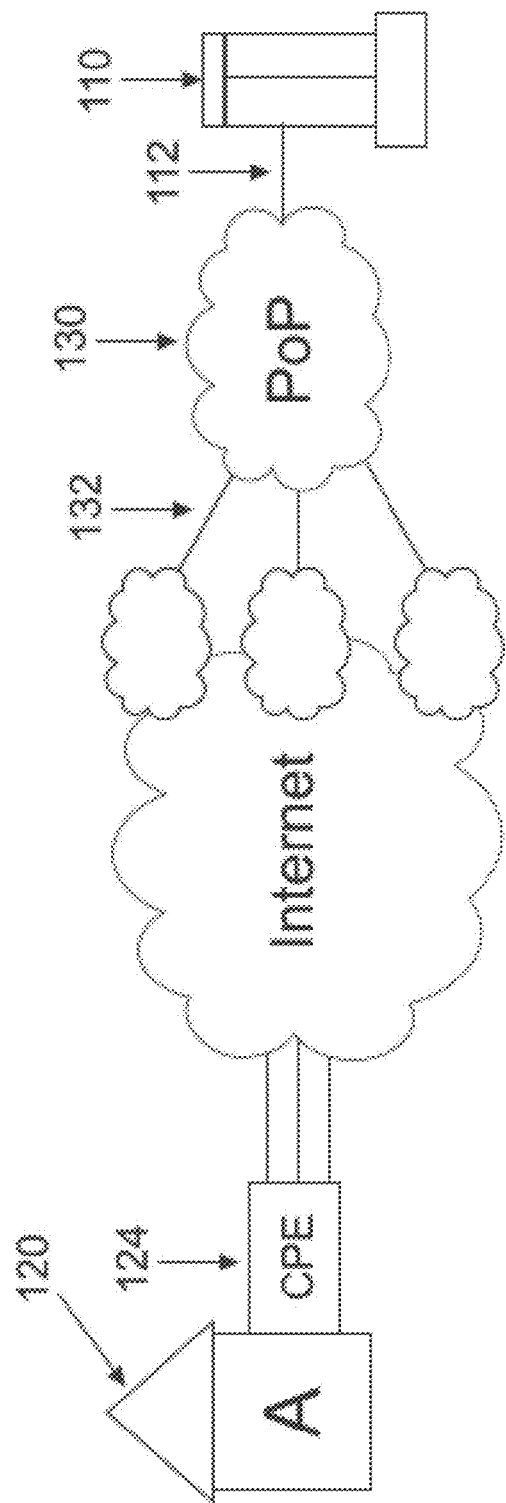
FIG. 2D shows a further implementation of a network architecture in which servers/concentrators are implemented as part of a Point-of-Presence, exemplary of an embodiment.

In another aspect, and as shown in FIG. 2D, one or more server/concentrators can be implemented at a physical location, as part of a Point-of Presence (PoP) (130). In an aspect, in the context of the present disclosure, a PoP (130) can define a relatively high concentration of servers/concentrators within an area. In another aspect, a plurality of PoPs (130) may be available in a geographic location. A plurality of PoPs (130) may be established based on network topology or service requirements in a given area.

In an aspect, each PoP (130) has one or more network backbone connections (132), because in some locations different network backbones may be available. The PoP (130) may be implemented so that it dynamically interoperates with surrounding networks. The PoP (130) is a collection of network components, established at the periphery of the network backbone (112), associated with a plurality of networks, and cumulatively providing network communication service to a one or more clients in a defined geographic area. In one possible implementation, the server/concentrators (110) located within the PoP (130) functions as a network access server for connecting to the Internet (112). The network access server (110) acts as the access point to the Internet (112) for a plurality of CPE devices (124) that are connected to the PoP (130). The servers/concentrators (110) may be configured to communicate with one another to share information regarding network conditions. Servers/concentrators (110) provide connectivity to CPEs (124) and may also run a networking protocol such as BGP to route servers and other network backbone connections (112).

In an aspect, servers/concentrators (110) are configured to detect changes in their network environment.

The CPE (124) may be configured to collect information from network components in its vicinity including from one or more available PoPs (130) and their servers/concentrators (110). The CPE (124) for example connects to a closest available server/concentrator (124), implemented as part of a PoP (130), and thereby having access to a connection to the network backbone (112). Whether the connection to the network backbone (112) is direct or indirect, the network connections are established so as to minimize long haul effects.

In one implementation, each CPE (124) wanting to establish a connection dynamically advertises its IP address, and receives replies from associated servers/concentrators (110) along with their current network performance information. The CPE (124) initiates a bonded/aggregated connection with a server/concentrator (110) that is both proximal (to minimize long haul effects between the CPE (124) to the network backbone (112)), and also that based on network conditions relevant to the particular server/concentrator, is performing well.

In one implementation, a network device is deployed that bonds or aggregate multiple, diverse links. The network device may be WAN aggregator or a link aggregator.

Once the network overlay is established, various other network optimization and quality of services ("QoS") techniques may be applied.

One or more CPEs and one or more concentrators (e.g. CC) can create various different network configurations that improve network performance in relation to network communications between them. The CPEs and concentrators are designed to be self-configuring, and to interoperate with one another to manage traffic in a more effective way.

"Proximal" means a distance such that based on relevant network conditions, long haul network communication and associated effects are avoided. The distance between the CPE and the server/concentrator is proximal, thereby enabling good network service. For example, the network components may be at disparate locations.

To take advantage of the network architecture disclosed herein, the server/concentrator (110) may be located at an access point to the network backbone (112) or in some other way to minimize the long haul effect, for example, by the server/concentrator being located proximal to an access point so as to further avoid long haul network communication.

In another aspect, the bonded/aggregated connection at Site A and the bonded/aggregated connection at Site B may be different, in the sense that each may include different types of network connections and that may be associated with different carriers. In an aspect, the network overlay provided operates notwithstanding such diversity.

The more sites that have the CPEs/CCs associated with them the better network performance between them. Representative performance details are described below.

The network backbone (112) could be any high performance network including for example a private WAN, the Internet, or an MPLS network.

Figure 2E:
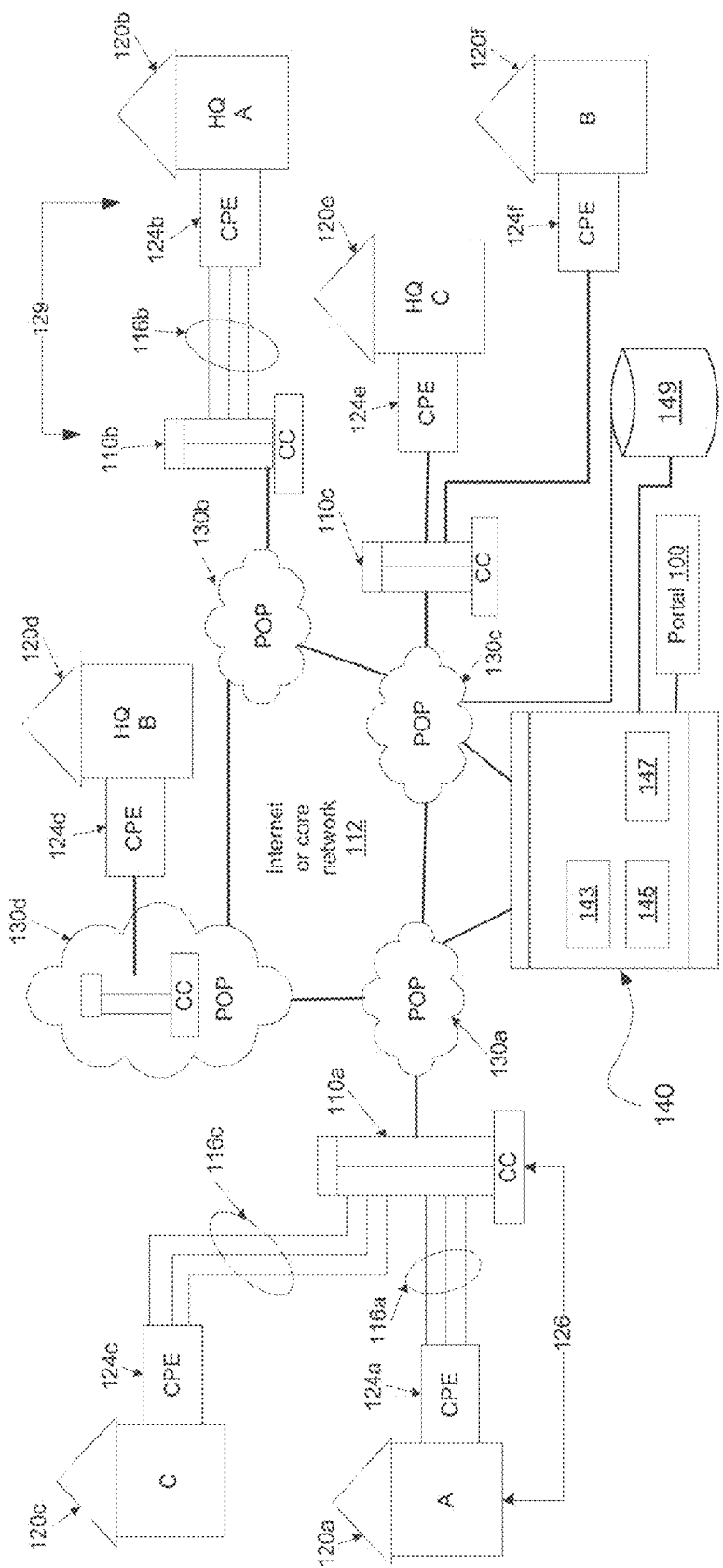
FIG. 2E shows a network solution with bonding/aggregation and cloud provisioning implemented at both Site A, Headquarter (HQ) A and Site C to connect to Internet and other sites, exemplary of an embodiment.

Referring now to FIG. 2E, a number of customer sites (120a, 120b, 120c, 120d, 120e, and 120f) are connected to each other via Internet 112, which may provide a secured private VPN network solution to multiple users. In an embodiment, the Internet may include a high performing network such as an MPLS network backbone that is typically provided by one carrier; multiple MPLS networks provided by multiple carriers may also be connected via multiple Points-of-Presence (POPs) to form a super network. As can be seen from the exemplary embodiment, each of Site A 120a and Site C 120c has a CPE (124a and 124c, respectively), which is then connected to a cloud concentrator CC 110a with some form of link aggregation/bonding technology as described elsewhere in this disclosure. The CC 110a can be also connected to other CCs (not shown) within a Point-of-Presence 130a located closest to Site A 120a and Site C 120c.

In another embodiment, some CCs may not be associated with a POP. Whether a CC is part of a POP may change over time, as CC and/or a cloud based Network Manager 140 (further described below) may dynamically receive and analyze real-time data regarding various network characteristics. For example, CC 110b or the cloud based Network Manager 140 may receive information indicating that a commonly used network path has failed due to power outage, it then may decide to seek alternative connection to the Internet via the closest POP 130d. As described below, the cloud based Network Manager 140 may configure or reconfigure the client site network components (e.g. CPEs) or network server components (e.g. CCs) in real-time or near real-time based on a plurality of network characteristics. For example, the Network Manager 140 may automatically reconfigure a CPE to collect network performance data and initiate the configuration of a network overlay to include one or more network server components to improve network performance.

In one embodiment, the Network Manager 140 may be operably linked to a central SCN database or data store 149, which may be a SQL database.

Figure 16A:
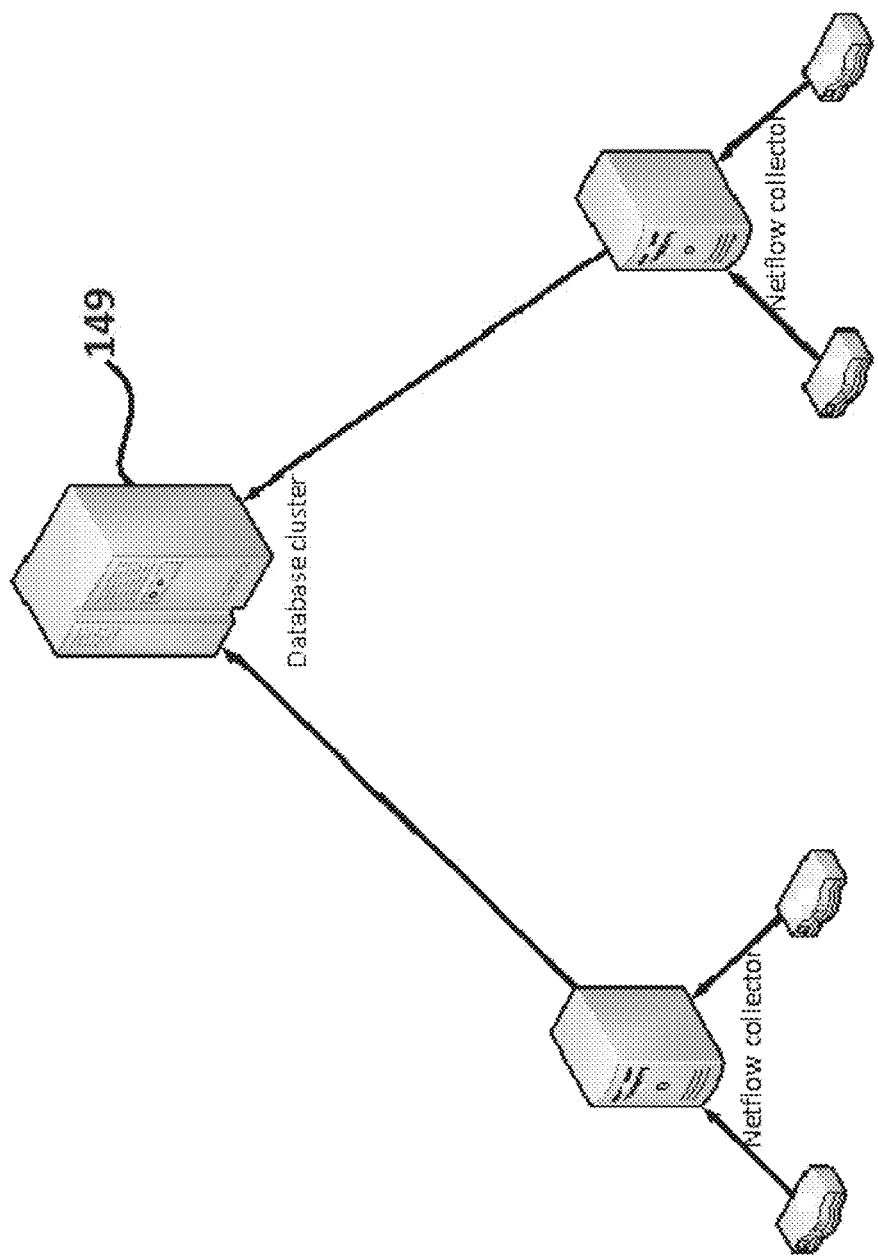
FIG. 16A shows an example relationship between a net-flow collector and a SCN central database.
Figure 16B:
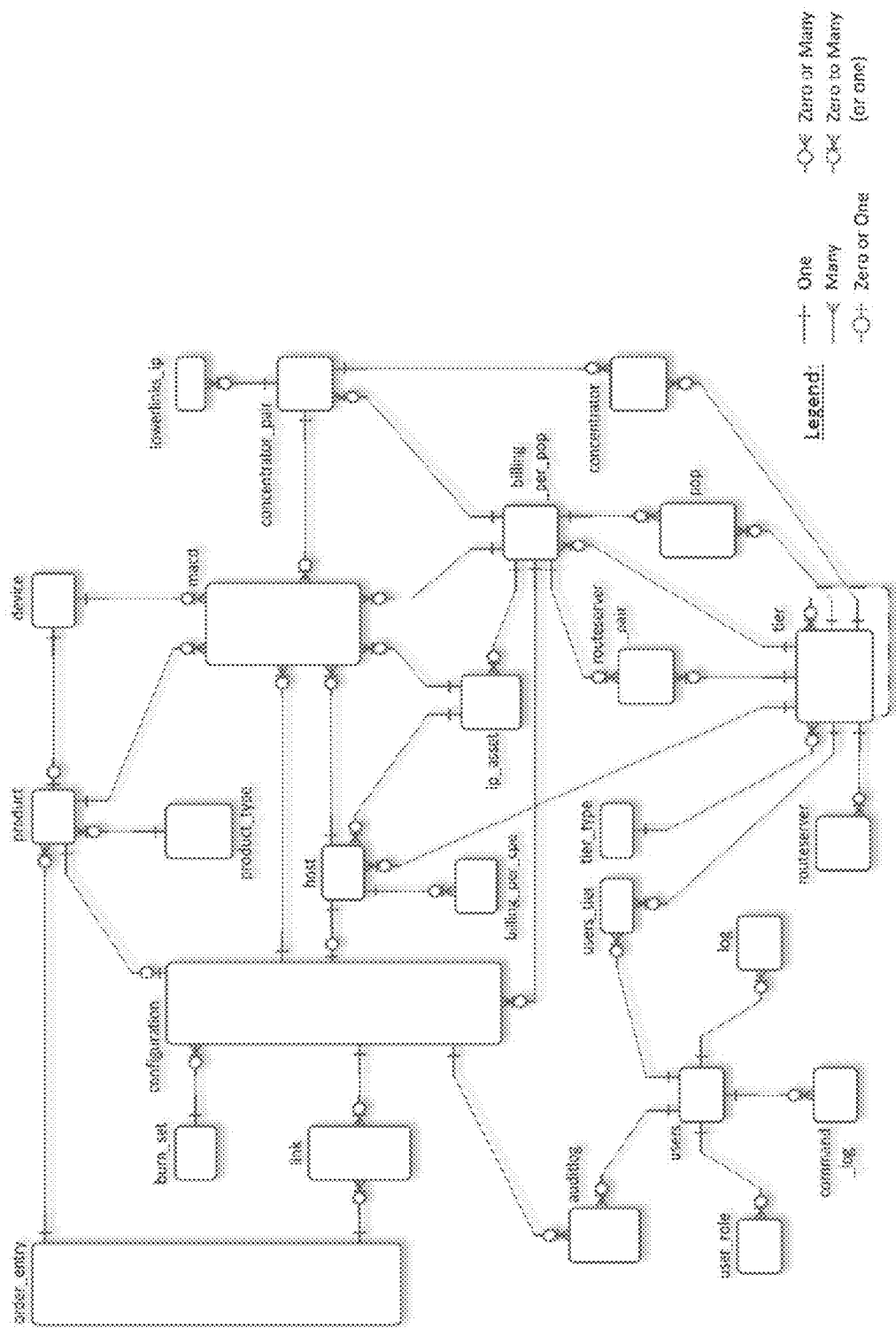
FIG. 16B shows an exemplary main entity relationship diagram (ERD) for a central SCN database.

FIG. 16B is an example main entity relationship diagram (ERD) for central SCN database 149. The database 149 may provide the following example functionalities: represent entities or objects for storage and reuse between sessions and pages; represent objects for security and management of applications; and store and retrieve data obtained from devices for historical data, troubleshooting or billing. The list of functionalities is not meant to be limiting and is illustrative of example functionality.

The architecture of embodiments disclosed herein can be understood as a centralized architecture for aggregating network connections, broadband or otherwise. Diverse network connections are aggregated into a virtual (logical) connection that provides higher throughput as well as independence of the network characteristics of the constituent (physical) network. The virtual connection can then be connected to a network in manners as described herein. Aggregation may be performed at a given CPE terminal.

For instance, in one example of the implementation, a Metro Ethernet 10 Mbps (E10) link and a T1 (DS1) link can be aggregated in accordance with embodiments as described below, in order to provide higher fault tolerance and improved access speeds. The aggregation of diverse carriers may extend to any broadband network connection including Digital Subscriber Line (DSL) communications links, Data over Cable Service Interface Specification (DOCSIS), Integrated Services Digital Network, Multi-protocol Label Switching, Asynchronous Transfer Mode (ATM), and Ethernet, etc.

The links to be aggregated can be any private or public Internet services such as cable, ADSL, T1, Fibre, xOE (over Ethernet types), wireless, as well as other MPLS connections so long as the network path reaches a CC for lower-link processing from a CPE terminal.

Network Overlay

In an aspect, one or more network overlays are established, thereby in an aspect providing a multi-POP network that exploits multiple points of presence so as to provide a persistent, configurable/reconfigurable network configuration that provides substantial network performance improvements over prior art methods.

In an aspect, the CPEs/concentrators may monitor network performance, including in the areas proximate to their position, and may reconfigure the network overlay dynamically, across multiple locations (including multiple PoPs) based on changes in network performance while providing continuity of service.

In an aspect, the network components of embodiments disclosed herein may be intelligent, and iteratively collect network performance information. Significantly, in an aspect each CPE is able to direct associated concentrator(s) and any CPE to in aggregate re-configure the network overlay.

Significantly, in the created network overlay 126, 129, management of the network may be centralized or decentralized, such as through the cloud based Network Manager 140, depending on the configuration that provides the best overall performance. This is in contrast to prior art solutions that generally require central management for example of termination of connection which results in traffic being carrier over bonded/aggregated connection that involve long haul transmission that fail to take advantage of network paths that may provide inherently better performance than the bonded/aggregated connection paths.

In an aspect, decentralized management is made possible by peer-to-peer functionality implemented to the network components.

In an aspect, a plurality of servers/concentrators may be established in multiple locations covering a plurality of different access points. Each server/concentrator may be used for multiple clients associated with different CPEs to improve network performance for such multiple clients by providing termination of their bonded/aggregated connection and transfer of communications to the network backbone. The network solution disclosed herein therefore may include multiple Points-of-Presence, distributed geographically including for example in areas requiring network service, and through the network architecture disclosed herein bridging geographically disparate areas with improved network communication therebetween.

In one embodiment, the connections within one or more network overlays 126, 129 may be implemented with Intelligence Packet Distributed Engine (IPDE), a system that can use an advanced queuing and distribution algorithm with bidirectional information to support asymmetrical environments. The IPDE can leverage the bandwidth of bonded or aggregated network connections, even where the links in the connection exhibit substantially different performance. In some aspects, the IPDE may support diverse carrier/access aggregation, combine differing speeds or latency links, and combine symmetrical and asymmetrical links.

In another embodiment, IPDE may further be implemented with the RLA (Rate-Limit-Avoidance) feature for lower links to recognize and avoid poor quality bandwidth regions of broadband circuits or connections. This technique can provide a queue bypass to optimize WAN and Internet traffic. IPDE may provide QoS to a public Internet network infrastructure, with improved quality for converged voice and data over public broadband links. In this manner, RLA reserved bandwidth options can give high priority traffic data (e.g. VoIP) both urgent and guaranteed delivery.

In another embodiment, the IPDE-RLA utility may be further implemented to automatically calibrate lower links and set the RLA parameters for optimal performance when mixing voice and data traffic. For example, an auto-calibration technique may use different lower-link characteristics to place customer traffic within usable low-latency range of circuit by: 1) automatically identifying poor-quality-bandwidth-region while measuring link bandwidth and quality to set the OPDe-RAL bandwidth and IPDE-weight settings for lower-links; 2) using the IPDE-RLA reserve values to ensure the reserved traffic has been accommodated for in the RLA settings for IPDE-RLA-Bypass traffic; and 3) automatically calibrating lower-links for data and data/voice users (e.g. with a single command) and adjusting appropriate parameters such as max bandwidth detected, RLA bandwidth detection, RLA reserved bandwidth, link weight setting, and lower-link MTE detection. In some aspect, IPDE-Queue parameters can be set automatically according to a RLA bandwidth for improved accuracy. In another aspect, auto-calibration can be scheduled for lower links whose bandwidth and quality may fluctuate. In particular, auto-calibration may be part of a CPE configuration during zero-touch provisioning when a CPE is remotely configured and calibrated by the Network Manager 140.

The IPDE or IPDE-RLA engine may be installed on the Network Manager 140, or at least may be operably linked or coupled to the Network Manager 140.

Additional Implementation Details

As previously stated, embodiments disclosed herein may be implemented in connection with any technology for bonding or aggregating links, and thereby reduce long haul effects.

What follows is additional detail regarding link aggregation, which is one form of bonding/aggregation that may be used as part of the overall network solution and network architecture disclosed herein.

In an aspect, the system, method and network architecture may be implemented such that the aggregated/bonded network connections described are implemented using the link aggregation technology described in U.S. Pat. No. 8,155,158.

What follows is further discussion of possible embodiments of the CPE and the server/concentrator (or concentrator) components previously described, emphasizing their creation and management of the bonded/aggregated connections between them, which in the network configuration disclosed herein form a part of the overall network overlay that incorporates the one or more portions that are carried over the network backbone.

Diverse network connections may be aggregated into virtual (logical) connections that provide higher throughput as well as independence of the network characteristics of the constituent (physical) network. Aggregation may be performed to a given CPE.

For instance, in one example implementation, a Metro Ethernet 10 Mbps (E10) link and a T1 (DS1) link are aggregated, in order to provide higher fault tolerance and improved access speeds. The aggregation of diverse carriers may extend to any broadband network connection including Digital Subscriber Line (DSL) communications links, Data over Cable Service Interface Specification (DOCSIS), Integrated Services Digital Network, Multi-protocol Label Switching, Asynchronous Transfer Mode (ATM), and Ethernet, etc. The network connections may also include a WAN.

According to an aspect, an apparatus is provided for managing transfer of communication traffic over diverse network connections aggregated into a single autonomous connection, independent of the various underlying network connections. The apparatus may include a network aggregation device and an aggregation engine. The network aggregation device may be adapted to configure a plurality of network connections, which transfers communication traffic between a further network connection and the plurality of network connections, as an aggregated group for providing a transfer rate on the further communication link, and to allocate to the aggregate group a rate of transfer equal to the total available transfer rate of the underlying networks. The aggregation engine may be adapted to manage the distribution of communication traffic received both to and from a plurality of network connections, establishing newly formed aggregated network connections. The aggregation engine may be implemented in software for execution by a processor, or in hardware, for example.

In accordance with this aspect, a plurality of diverse network connections may be aggregated to create an aggregated network connection. The diversity of the network connections may be a result of diversity in provider networks due to the usage of different equipment vendors, network architectures/topologies, internal routing protocols, transmission media and even routing policies. These diversities may lead to different network connections with different latencies and/or jitter on the network connection. Also, variation within transmission paths in a single provider network may lead to latency and/or jitter variations within a network connection.

Latency and jitter typically affect all data communication across the network connection. Latency may refer to the round-trip time for a transmission occurring end-to-end on a network connection. Jitter may refer to the variance in latency on a network connection for the same data flow. High latency and jitter typically have a direct and significant impact on application performance and bandwidth. Applications such as VOIP, and video delivery are typically sensitive to jitter and latency increases and can degrade as they increase.

Transparent aggregation of a plurality of network connections in an aggregated network connection requires the management of data transmitted over the aggregated connection by the aggregation engine and received from the aggregation traffic termination engine. In an aspect, transparent aggregation does not require any configuration by a network provider. The aggregation engine and the aggregation traffic termination engine may manage data transmission such that the variable path speeds and latencies on the plurality of network connections do not affect the application data transmitted over the aggregated network connection. The network aggregation engine and the aggregation traffic termination engine may handle sequencing and segmentation of the data transmitted through the aggregated connection to transparently deliver application data through the aggregated connection with minimal possible delay while ensuring the ordered delivery of application data.

In an aspect, the network aggregation engine provides a newly aggregated network connection with a capacity equal to the sum of the configured maximum throughput of the network connections.

The aggregation engine and an aggregation traffic termination engine (further explained below) handle the segmentation of packets as required in confirmation with architectural specifications such as Maximum Segment Size (MSS) and Maximum Transmission Unit of the underlying network connections. The network aggregation device is operable to handle assignment of sequence identifiers to packets transmitted through the aggregated network connection for the purpose of maintaining the ordering of transmitted data units over the aggregated network connection.

In a further aspect, the network connection device includes or is linked to a connection termination device, and a plurality of fixed or hot swappable transceivers for transmitting communication traffic on respective sets of network connections, for the purpose of configuring a plurality of network connections as an aggregated connection or the management of multiple aggregated network connections and providing access to the aggregated network connection for any network communications traversing the device.

In the present disclosure, routing protocols or route selection mechanisms described are intended only to provide non-limiting examples.

Figure 3:
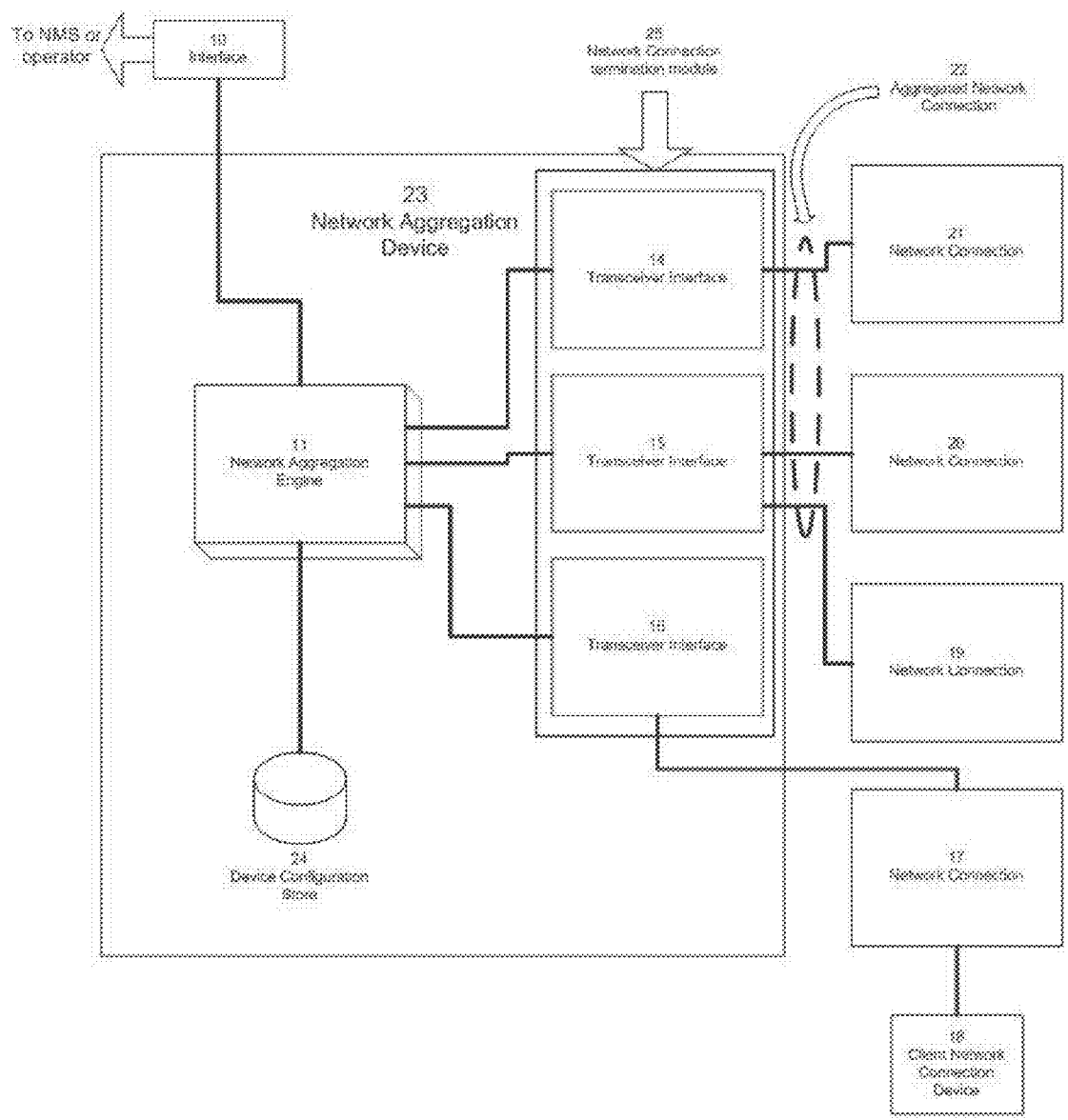
FIG. 3 is a block diagram of a communication device providing aggregation means on the client/CPE side of a network connection, exemplary of an embodiment.

FIG. 3 is a block diagram of a communication device acting as a client, exemplary of an embodiment.

As shown in FIG. 3, the network element/network aggregation device (also referred to in this disclosure simply as the "device" or the "network aggregation device") 23 includes (in this particular embodiment shown for illustration) a network connection termination module 25 that includes representative transceiver interfaces 14, 15 and 16. Each transceiver interface 14, 15 and 16 represents an interface to a physical communication medium through which communications may be established to network connections.

A possible implementation of the network aggregation device may use a single or multiple chassis with slots for multiple network connection termination modules and multiple network aggregation engine modules. The multiple network connection termination modules may be grouped by protocol specific or medium specific transceiver/interfaces.

The network aggregation engine 11 may handle the configuration of the network aggregation device and all related interactions with external inputs. A device configuration store 24 may provide persistent data storage for device configuration information such as a network aggregation policy.

The network aggregation engine 11 may handle queries from external sources, such as configuration parameters of a network management protocol such as Simple Network Management Protocol, for example. The interface 10 may be a protocol agent and may provide for communication with a Network Management System (NMS) or operator system for configuration of the aggregation engine by the definition of an aggregation policy. Control and management information may be transferred between the network aggregation device 23 and the NMS or operator system through the interface 10 via any available or specifically designated network connection 19, 20, 21 and 17 through any transceiver interface 14, 15 and 16.

In accordance with an aspect, multiple network connections may be combined to form an aggregated network connection 22, as disclosed in further detail herein. Each individual network connection may be configured with a maximum communication traffic rate, which may be expressed as a bit rate in bits per second.

The network aggregation engine 11 may be implemented in software for execution by a processor in the network aggregation device 23, or in hardware such as by means of a Field Programmable Gate Array (FPGA) or other integrated circuit, or some combination thereof. The network aggregation engine 11 may be implemented in a distributed manner by distributing aggregation engine intelligence to the network connection termination module 25.

The network aggregation engine 11 may receive traffic from client network connection device 18 through a network connection 17 provided through a transceiver interface 16. The client network connection device 18 may be any device including, without limitation, a router, switch, or media converter that is capable of providing termination for a single or multiple client nodes, where nodes are any devices capable of connecting to a network irrespective of protocol or interface specificity. In various embodiments, traffic may be received over multiple network connections through a single or multiple transceiver interfaces. The network aggregation engine 11 may accept all traffic from the client network connection, may provide encapsulation and segmentation services for the traffic for transmission through the aggregated network connection 22, and may transmit it over any of the network connections 19, 20 and 21 through any of the transceiver interfaces 14, 15 and 16. The network aggregation engine 11 may handle segmentation in a manner that avoids the fragmentation of aggregated communication traffic received through the client network connection device 18, when transmission occurs over the aggregated network connection 22 through any of the network connections 19, 20 and 21, by ensuring that the length of a packet/frame transmitted over any of the network connections 19, 20 and 21 is less than or equal to the configured or detected frame length for the respective connections in the aggregated network connection 22.

The network aggregation engine 11 may poll the state of network connections 19, 20 and 21, for example as per configured intervals stored in the device configuration store 24, to ensure that all network connections configured in an aggregated group are within configured acceptable tolerances. If a network connection 19, 20, and 21 exceeds acceptable tolerance values for any of the polled parameters, the network aggregation engine 11 may remove the network connection 19, 20, and 21 from within the aggregated network connection 22 without removing it from the polled network connections list. By leaving the removed network connection 19, 20, and 21 in the polled network connection list, the network aggregation engine 11 may aggregate the network connection into the aggregated network connection 22 once it has come back within acceptable tolerance values. This may ensure that a network connection may change states between residing in an aggregated network connection 22 or not, without the intervention of an external system or input. The network aggregation engine 11 may handle notifications to all end points configured within the device configuration store 24 with internal events such as changes in network connection state, threshold violations on configured thresholds for any number of configurable variables for any object within or connected to the network aggregation device 23. The network aggregation engine 12 may also handle events such as changes in the state of a network connection 19, 20, and 21 included in the aggregated connection, changes in latency of a network connection included in the aggregated network connection 22, scheduling changes, event logging, and other events.

Figure 4:
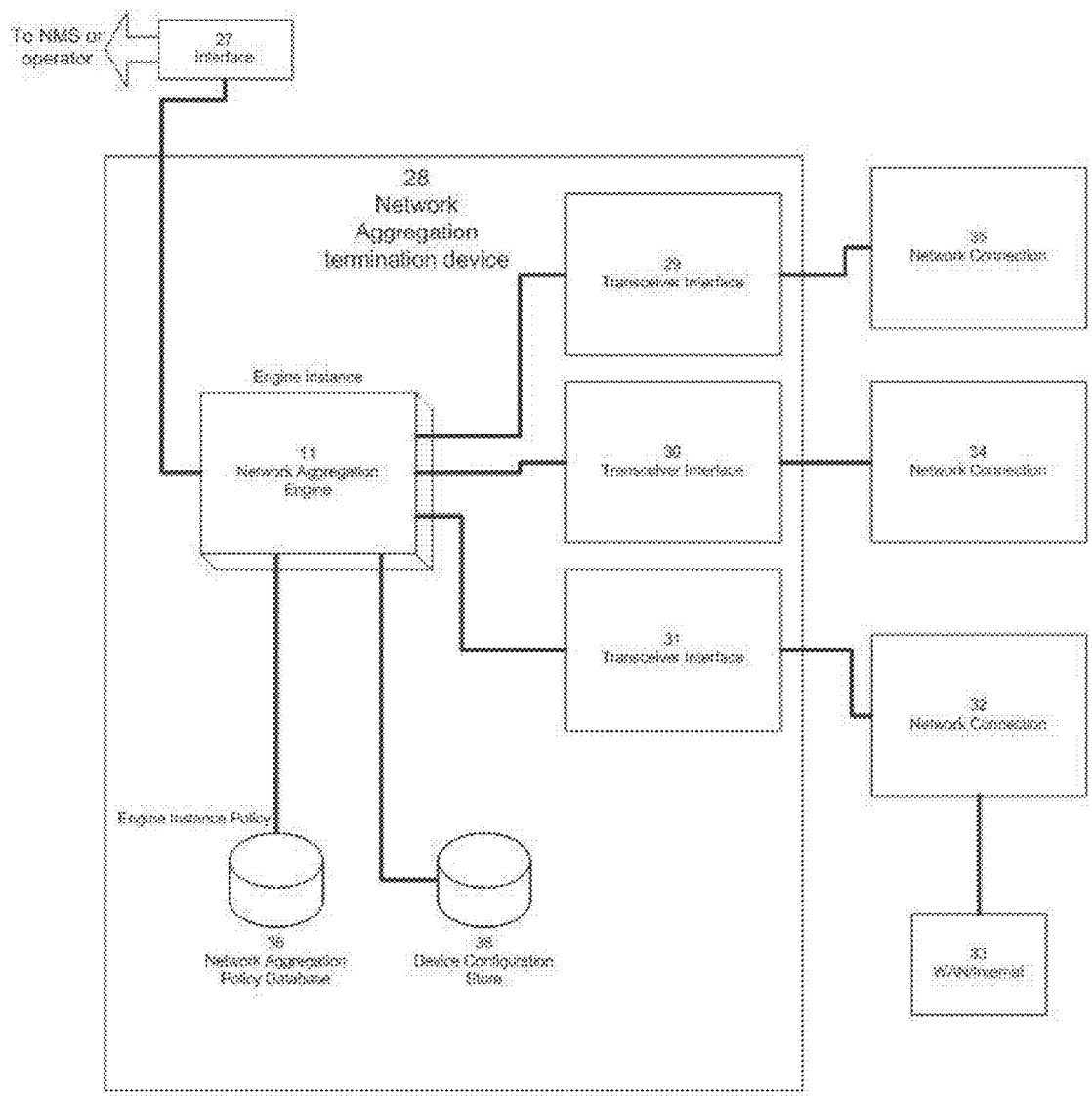
FIG. 4 is a block diagram of a communication device providing aggregation means on the server/concentrator side of a network connection, exemplary of an embodiment.

FIG. 4 is a block diagram of a communication device acting as a server/concentrator, exemplary of an embodiment.

The network aggregation engine 11 may provide access to a network aggregation policy database 36 which stores configuration information related to the various aggregated network connections that terminate on the aggregated network connection device 28. The network aggregation termination device 28 may be implemented in such a manner that each aggregated network connection defined in the network aggregation policy database 36 is handled by its own virtual instance, the use of which enables termination of each aggregated network connection from multiple customer premises equipment (CPE).

Figure 5:
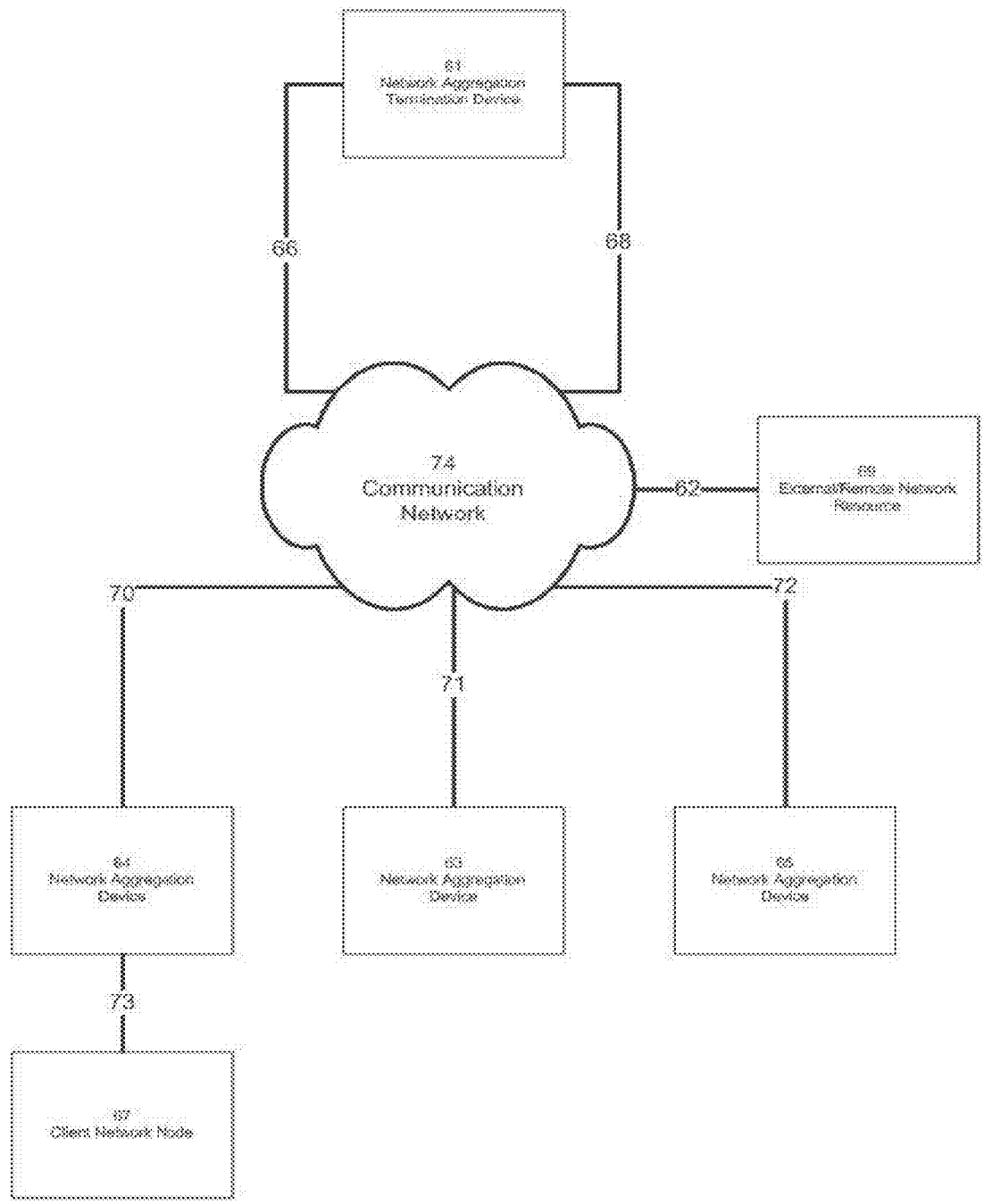
FIG. 5 is a block diagram of a communication network providing aggregation means on both the client/CPE side and server/concentrator side of a network connection, exemplary of an embodiment.

FIG. 5 is a block diagram of a communication network acting as a client/CPE and server/concentrator, exemplary of an embodiment.

In accordance with an embodiment, aggregated network connections 70, 71 and 72 may be built by network aggregation devices 63, 64 and 65, which terminate to a single aggregated network connection termination device 61 through network connections 66 and 68 as their endpoint. The aggregated network connection termination device 61 may access external communications networks through network connections 66 and 68 to access external/remote network resource 69. Access to external communications networks may be provided by the aggregated network connection termination device 61 by using either network connection 66 or 68 through the use of a routing protocol, such as Border Gateway Protocol (BGP), Open Shortest Path First (OSPF) protocol, or through the use of simpler mechanisms such as load sharing over multiple static routes within the communication network 74 that acts as the valid next-hop for the aggregated network connection termination device 61.

Aggregated network connections 70, 71 and 72 may provide access to client network nodes 67 connected to the network aggregation devices 63, 64 and 65 through the aggregated network connections 70, 71 and 72 to communications networks 74 accessible by the aggregated network connection termination device 61.

A client network node 67 may request data provided by an external/remote network resource 69 accessible through a communication network 74. This request for the external/remote network resource may be routed over the network connection 73 providing access from the client network node 67 over the aggregated network connection 70 to its end point which is the aggregated network connection termination device 61. This may be done through the communication network 74 by way of the network connection 66 into the aggregated network connection termination device 61. Any data sent by the external/remote network resource 69 may be routed back through the aggregated network connection termination device.

A particular embodiment may use the Internet as the communication network 74 referenced in FIG. 5. However, the communication network 74 may alternatively be built by multiple sub-networks created through the use of multiple network aggregation devices 63, 64 and 65 with aggregated network connection termination device 61 end points through multiple network connections 66 and 68.

Figure 6:
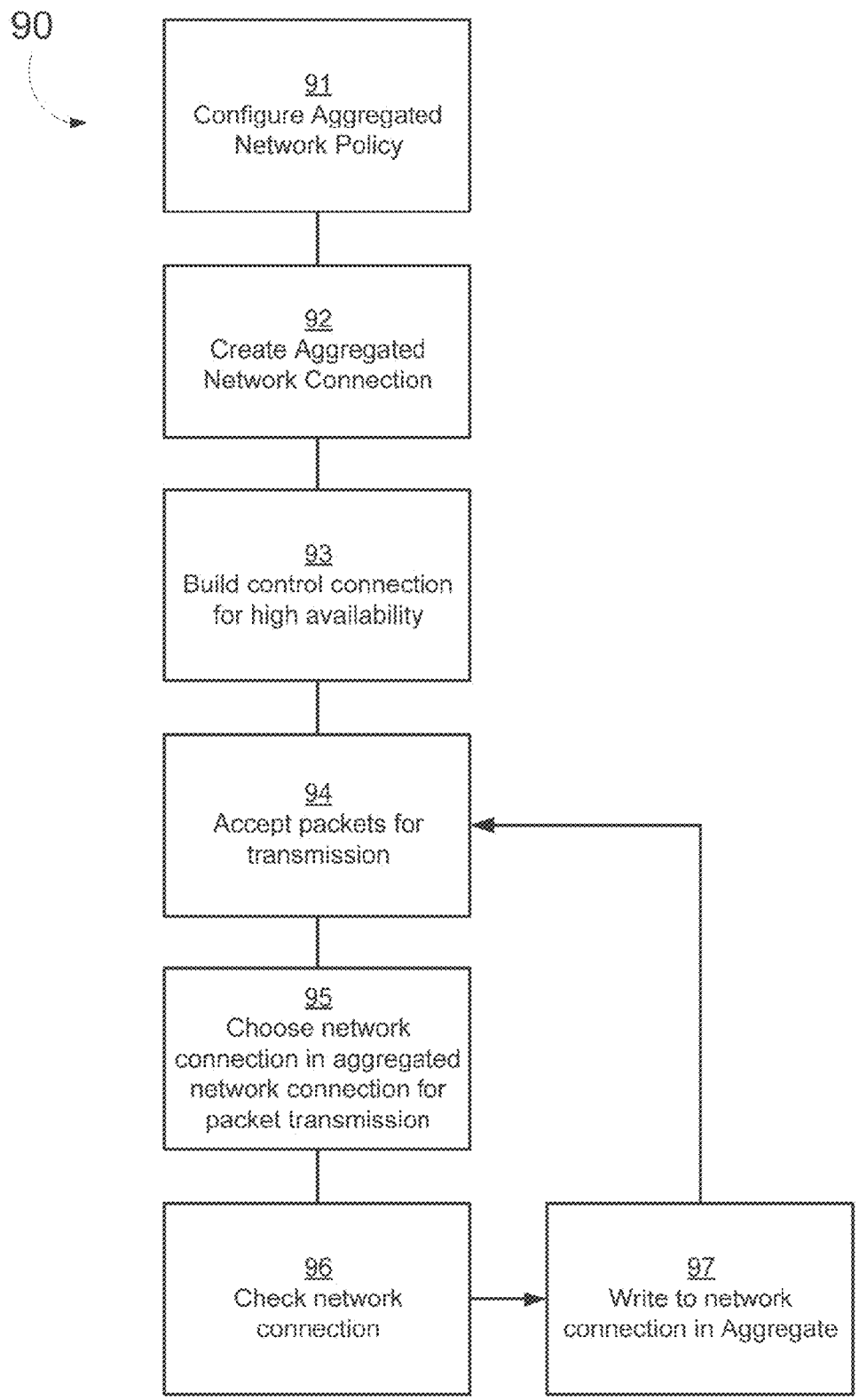
FIG. 6 is a flow diagram of a method of providing redundancy and increased throughput through a plurality of network connections in an aggregated network connection, exemplary of an embodiment.

A further aspect relates to the provisioning of high availability over the aggregated network connection by the network aggregation engine 11. FIG. 6 illustrates a method of providing redundancy and increased throughput through a plurality of network connections in an aggregated network connection. The method 90 may begin with a step of configuring a plurality of network connections 91 through the creation of a network aggregation policy to form 92 the aggregated network connection. The aggregated network connection may be initialized as per the network aggregation policy. Control connections may be created 93 for the plurality of network connections configured as part of the aggregated connection to allow the aggregation engine 11 to manage the membership of a network connection within the aggregated connection. The network aggregation engine 11 may accept packets for transmission 94 over the aggregated network connection 22. The network aggregation engine 11 may choose a network connection 95 among the group of network connections configured 91 in the aggregate in the stored aggregation policy for transmission of the current packet being transmitted. The choice of network connection for transmission of the current packet may be specified within the aggregation policy and may take into account data provided by the control connection built at 94.

According to an embodiment, a non-responsive network connection may be easily detected when using latency and packet loss as a measure. The mechanism for detecting 96 and adapting to 97 the network connection change within an aggregated network connection may be implemented within the data transmission routine in the aggregation engine 11 or as a separate process in parallel to the transmission routine in the aggregation engine 11 to allow for further flexibility in provisioning redundancy within the aggregated network connection.

Since this may occur on a per packet basis as opposed to on a per stream basis, a single non-responsive network connection may not affect the aggregated network connection and may allow data transmission to continue regardless of the individual states of network connections so long as a single network connection within the aggregated network connection is available for data transmission.

Example in Operation

Figure 7A:
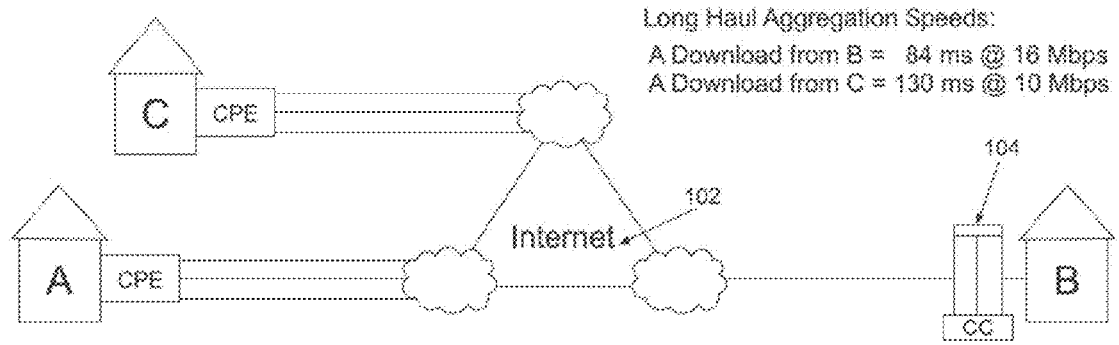
FIG. 7A illustrates a prior art network architecture where long haul effects apply, and presents network performance based on download speed.
Figure 7B:
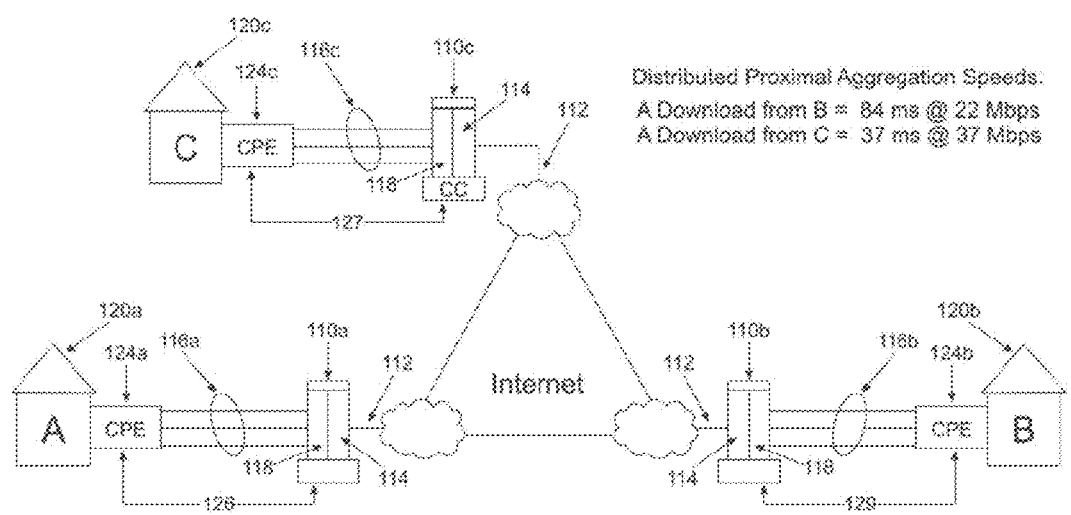
FIG. 7B illustrates, in similar network conditions as in FIG. 7a, an embodiment that reduces long haul bonding/aggregation, improved network performance based on faster download speed.

In one possible implementation, 3 locations are provided namely Site A, Site B, and Site C, and Site D. FIGS. 7A and 7B illustrate network performance as discussed herein. FIG. 7A illustrates performance with long haul effects. FIG. 7B illustrates performance with reduction of long haul effects, based on the embodiments disclosed herein in network conditions otherwise similar to those on which FIG. 7A is based.

FIG. 7B shows an improvement in performance over FIG. 7A, based on reduction of long haul effects in relatively long distance network communications are implemented using the network architecture.

Embodiments disclosed herein therefore may provide improved network performance relative to speed and performance. Other aspects of network performance are also improved, based on embodiments disclosed herein, for example latency.

Overview of Cloud Provisioning

As detailed herein, cloud provisioning may be implemented using a collection of applications including a cloud based Network Manager (Orchestration) 140 and an automated cloud management portal (orchestration portal) 100 (see e.g. FIG. 2E). The Network Manager 140 and the portal 100 may provide orchestration and automation of a wide area network through providing virtualized network services and other applications. These services and applications can cooperatively provide Software Controlled Networking (SCN) solutions using distributed points-of-presence across a region. Network Manager 140 and Portal 100 cooperate to provide a cloud-based interface that enables comprehensive network management and automated provisioning.

In an embodiment, the Network Manager 140 and Portal 100 may be implemented to provide the following features to provide SDN or SCN solutions:

| SD WAN (SDN) | IP Networking | Network Manager 140 and Portal 100 | Advanced Functions of Network Manager 140 and Portal 100 |
|---|---|---|---|
| Orchestration | Management Plane | SCN Portal | Multi-System Integration (OE, Tickets, NMS, CPE API) |
| Control Plane | Forwarding Plane | CC Multi-PoP | Virtual Control Plane (FIB, VE to ViF, OSPF) |
| Data Plane | Route Table | CPE | Virtual Data Plane (Routes, ANA Vif, DG or OSPF) |
| Encryption | IPSec | Security | Transparent Encryption (LL & Core Transport) |
| OTT-Lower Plane Infrastructure | | | |
| Core/Cloud Infrastructure | Internet | Multi-PoP (Multi-Peer, NNI, CNI) | iBGP |
| Site/Branch Infrastructure | Internet or Private Line | Cable, ADSL, etc. | IP, MPLS, Ethernet |

The SCN solutions may be implemented as a software layer on top of existing carrier networks, creating virtual networks for business customers across one or more regions. The SCN solutions may provide WAN and Internet optimization using existing infrastructures, and create faster high performance networks for lower cost with centralized provisioning, monitoring and management of networks.

In an embodiment, SCN solutions may include Zero Touch Provisioning (ZTP) for efficiently pre-configuring devices for customer premises.

In an embodiment, SCN solutions may be managed through an automated management and provisioning portal that can help shrink operational costs while managing the user's Quality of Experience, as further elaborated below.

In an embodiment, SCN solutions may be implemented as Software Defined Services using Over-The-Top Virtual Network Solutions without equipment replacement of routers and switches along the network path.

Embodiments of a cloud provisioning system disclosed herein may include cloud based Network Manager 140, which may include or be operably connected to a cloud-based automated network management portal 100, as well as associated applications. The cloud based Network Manager 140 may be connected to the existing network 112 (e.g. Internet or a core network) through one or more of CCs 110 or one or more POPs 130.

In an embodiment, the present solution provides improved efficiency and customer service for networking and telecommunications providers, eliminating many tasks and touch points on customer premises (CPE) and network infrastructure.

In an embodiment, the present solution, in conjunction with customer premise equipment (CPE), may be implemented using a single, low cost cloud-managed device. In an embodiment, the present solution allows service providers to seamlessly integrate network optimization as a service and control these features from a cloud-based management portal.

In an embodiment, virtual features are built into the software providing WAN optimization and Internet optimization, using acceleration to increase WAN and Internet throughput, aggregation to increase WAN and Internet bandwidth, IPQS to provide bi-directional quality assurance for WAN and Internet traffic, and seamless failover to provide high availability for WAN and Internet, and a single sign-on cloud portal improves quality of service while reducing operational costs. The CPE and services may be remotely provisioned, monitored and managed.

In another embodiment, the Network Manager 140 may comprise one or more of the software modules listed in table below:

| | |
|---|---|
| Billing | This modules addresses billing related items, such as reports and viewing bandwidth usage or client uptime. |
| Dashboard | This modules addresses main landing page with appropriate logo and menu, both of which can be customized. |
| IP Management | This modules manages IP address spaces and IP assets, assignment, reassignment, adding and removing IP assets. |
| Jobs | This modules addresses management of periodic tasks and activities that need to be performed for the operation of the Network Manager 140 and the Portal 100 as a whole |
| Monitor | This modules addresses activities related to monitoring and troubleshooting devices, mostly read-only information to view behavior and gather feedback about devices and infrastructure in the field |
| Operations | This modules addresses activities used by the operations department to provision and configure devices in preparation for delivery to customers |
| Sales | This modules addresses order entry point for internal use and gathering of customer information. |
| Site | This modules addresses global items related to the Portal 100, menu, messages, emails and errors. |
| Staging | This modules addresses image buring and verification for devices. |
| System Admin | This modules addresses management of the system, user management, tier management, site wide caching, roles and permissions. |

Figure 8A:
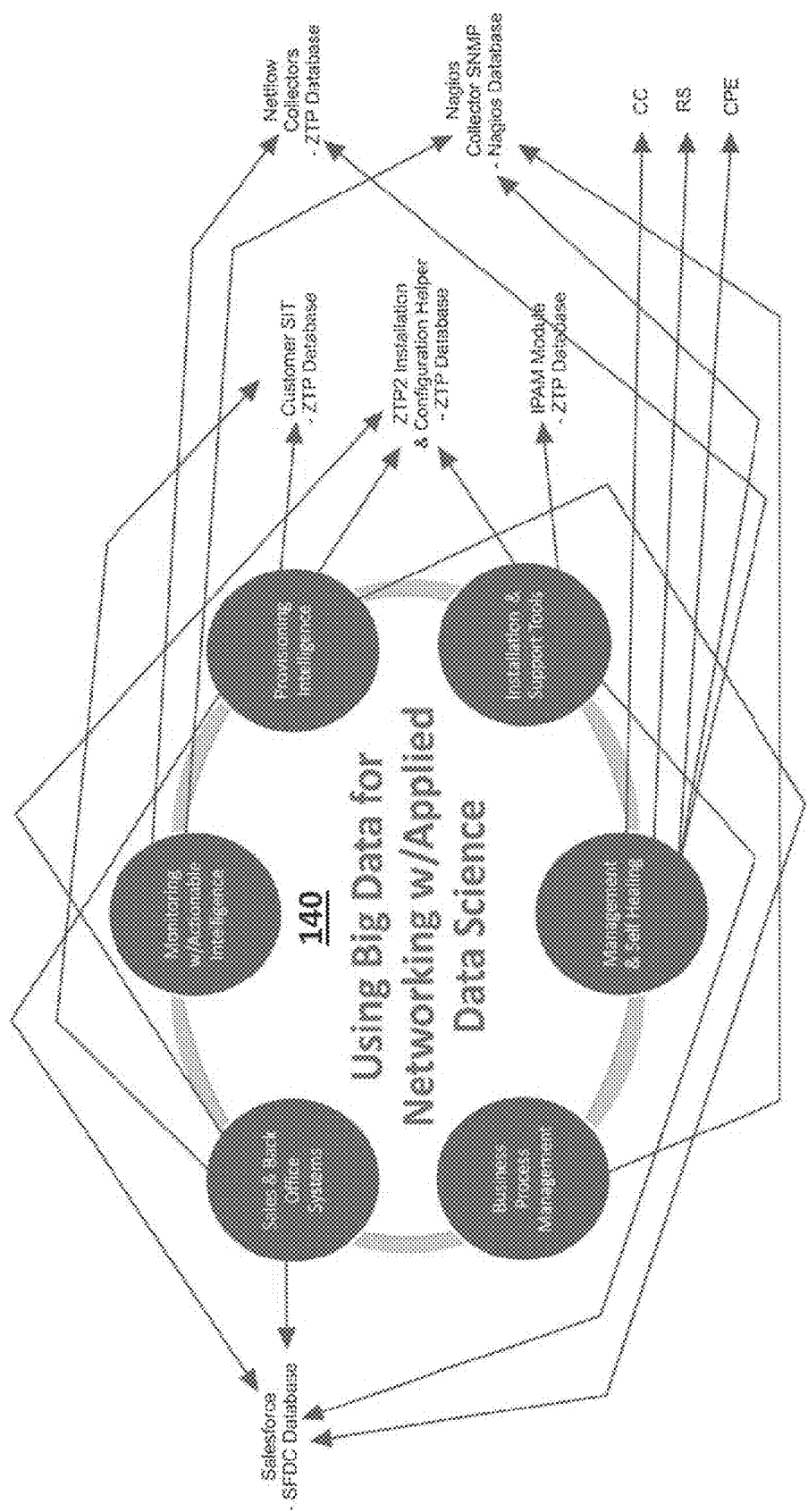
FIG. 8A illustrates a cloud provisioning system, exemplary of an embodiment.

FIG. 8A schematically illustrates a cloud provisioning system, exemplary of an embodiment. In this example, the cloud provisioning system may be configured to use big data for networking with applied data science. Data from various sub-systems or modules (e.g. sales and back office systems, business process management, provisioning intelligence and so on) may be collected.

Network partners can benefit from advanced network data science and traffic analytics to run their networks, all without requiring to login to every CPE device.

Figure 8B:
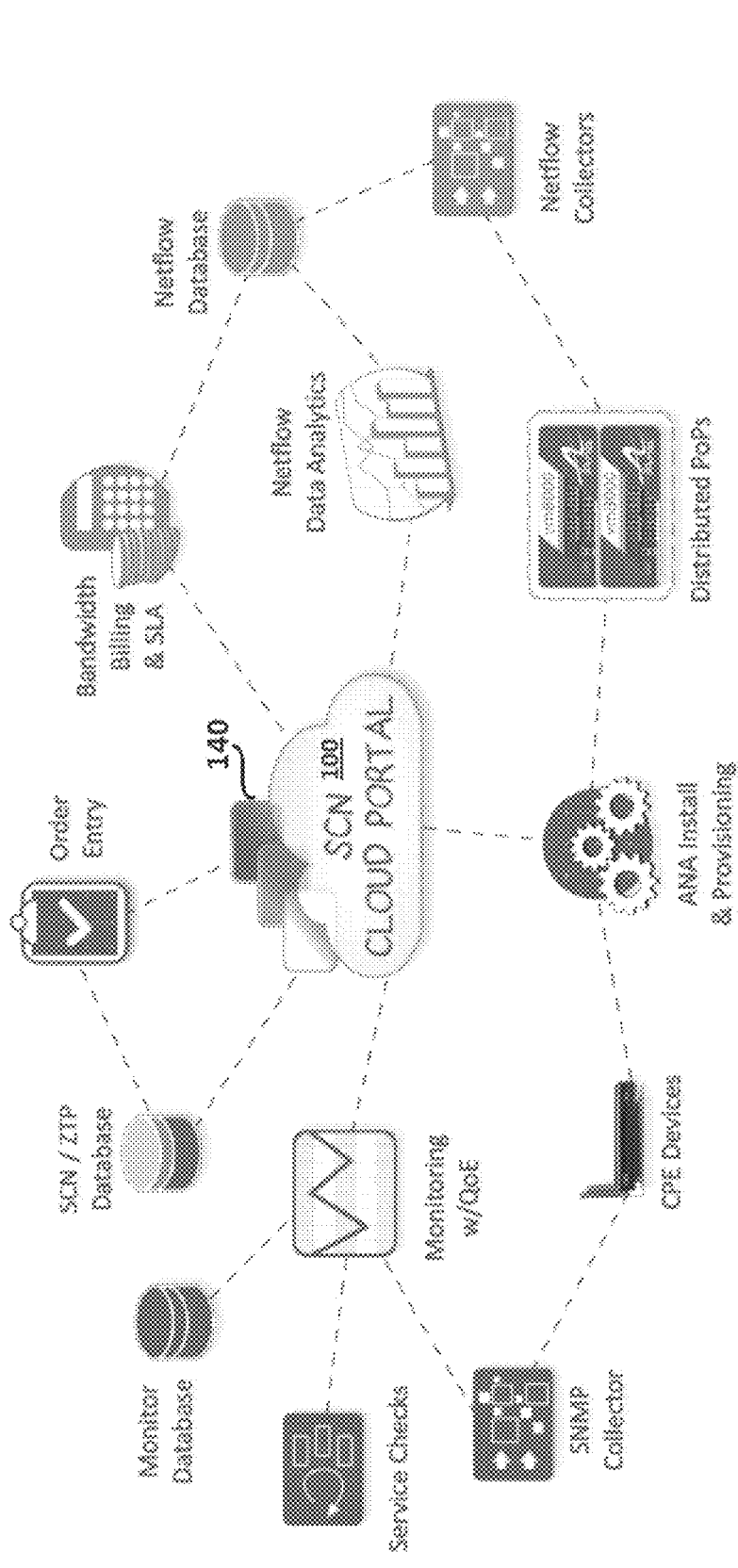
FIG. 8B illustrates an electronic portal in a cloud provisioning system, exemplary of an embodiment.

Referring to FIG. 8B, an electronic Management Portal 100 may be provided, which facilitates management of networks. The portal may help shrink operational costs while managing the user's Quality of Experience (QoE). The Management Portal 100 may also be referred to as a ZTP Portal 100 or SCN Cloud Portal 100 (or more generally as Portal 100) throughout this disclosure. The Management Portal 100 may involve a vertically integrated multi-systems implementation that connects a variety of management, monitoring and provisioning systems into a unified cloud management application, such as Network Manager 140.

As shown in FIG. 8B, the Management Portal 100 ties various systems together and presents complex tools through a convenient interface for network operators and end customers.

In an embodiment, the cloud provisioning network may be managed through the Management Portal 100 which allows partner operators to control the provisioning, configuration and deployment of the Autonomous Network Aggregation (ANA) solution to customers using a friendly Web-GUI with features including:

Order Entry

Zero-Touch Provisioning

Install and configuration

Quality-of-Experience

Monitoring and Management w/Advanced Traffic Analytics

Self-healing Network capabilities able to fix and recalibrate connections remotely Automatically optimize WAN and Internet performance as network conditions change Multi-Systems Integration In an embodiment, the Management Portal 100 provides access to a suite of functions and widgets that work with an authenticated API on the CPE device to send and retrieve information and configuration data.

In an embodiment, once a customer orders a CPE device, a Zero Touch Provisioning process provided at Management Portal 100 can automatically pre-configure the CPE device with parameters relating to customer and service information prior to shipment. When a customer receives the pre-configured CPE device, the CPE device may automatically connect to the Internet and join a virtual network. The CPE device may also be pre-configured to automatically perform device calibration. Further, the CPE device may be pre-configured to automatically register with a monitoring system and/or a remote management system.

Figure 9:
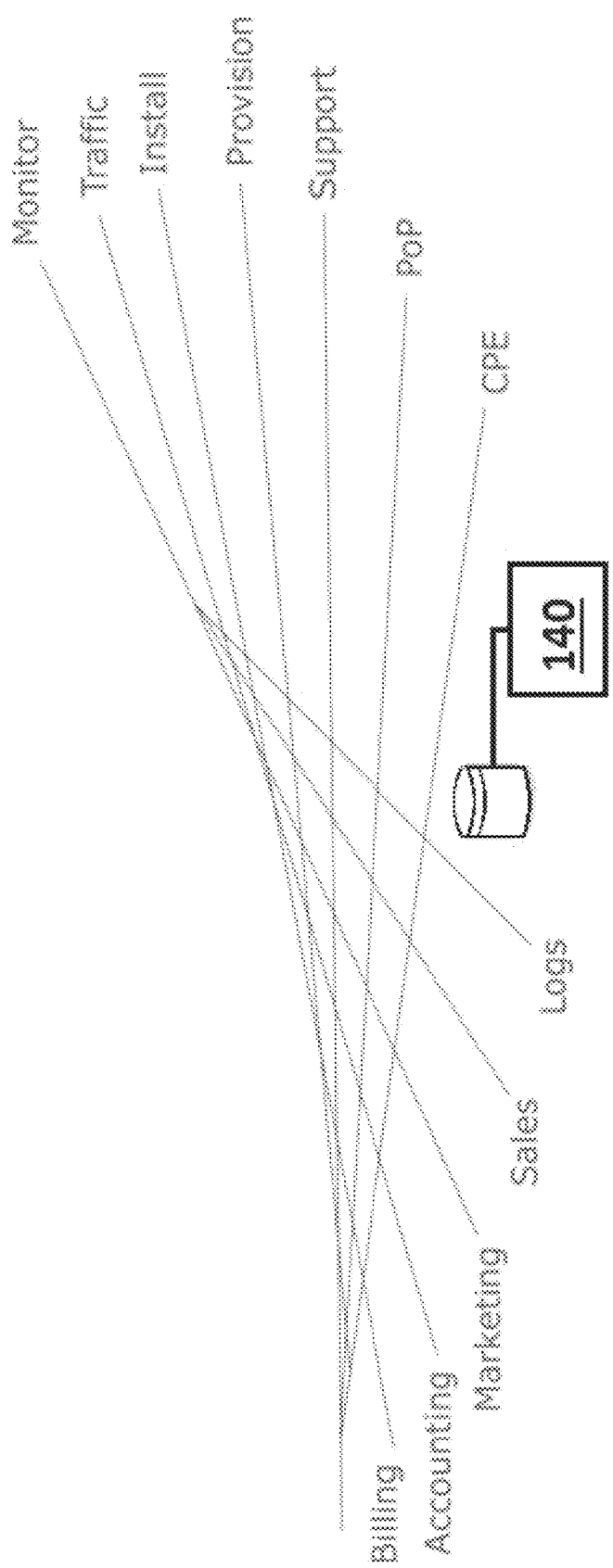
FIG. 9 illustrates multiple data sources in a cloud provisioning system, exemplary of an embodiment.
Figure 10A:
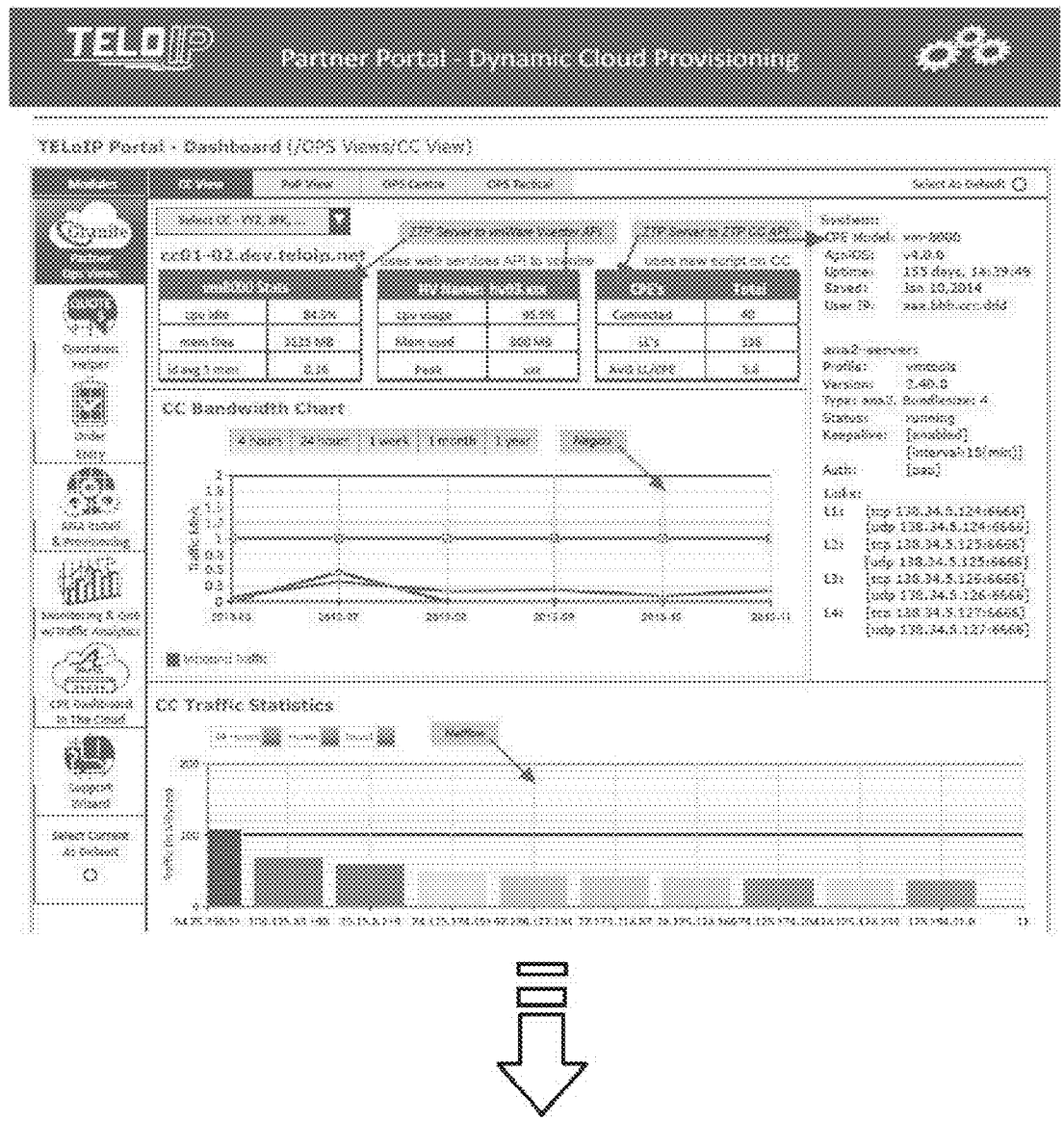
FIG. 10A illustrates a first portion of a Cloud Concentrator Dashboard interface shown on a Portal as provided by a Cloud Based Network Manager, exemplary of an embodiment.
Figure 10B:
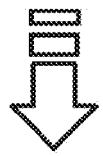
FIG. 10B illustrates a second portion of a Cloud Concentrator Dashboard interface shown on a Portal as provided by a Cloud Based Network Manager, exemplary of an embodiment.
Figure 10B:
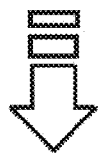
Figure 10D:
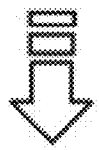
FIG. 10D illustrates a forth portion of a Cloud Concentrator Dashboard interface shown on a Portal as provided by a Cloud Based Network Manager, exemplary of an embodiment.

FIG. 9 illustrates multiple data sources or systems that may be connected directly or indirectly to the Management Portal 100 in a cloud provisioning system, exemplary of embodiments. For example, part or all of billing, accounting, marketing, sales, logs, CPE, PoP, support, provision, install, traffic and monitor may be integrated into the cloud provisioning system, providing real or near real time data to the Management Portal 100.

In an embodiment, the cloud provisioning system also provides autonomy and flexibility as it is customizable based on customer requirements, offer requirements and specific needs without physical interventions to the system; and it is more reactive to customer needs, as easy as a screen refresh.

In addition, the following advanced portal features may be provided to customers and users at large:

Remotely Provision Additional Services with ZTP;

Add another Link to Increase the Bandwidth;

Prioritize Application Traffic with QoS;

Use full solution of business IP services;

CPE Bandwidth, Uptime and Tools;

Alerts with more business intelligence; and

VoIP support tools.

In an embodiment, the cloud provisioning system and the Management Portal 100 may further offer improved operational efficiency/lower OPEX:

Building and managing low-cost, high quality IPSec VPN and remote access

Service scalability with quick and simplified service deployment

Focus on core business and leverage network management

Reduce IT/Telecom overhead

Turnkey solution that easily integrates with existing infrastructure

Maximizes human resources, systems/IT resources, application resources, and truck roll resources.

In an embodiment, the cloud provisioning system and Management Portal 100 interface also can provide increase Intelligence using Multiple Data Sources:

Assistance: Installation, Configuration, Provisioning, Support Tools/Wizards;

Alerts: More Intelligence with Business Process Management;

Action: Rapid Response with Data Intelligence; and

Adaptive: Self-Healing Network and OSS Technology Analytics: Network and Application Reporting and Analysis.

In an embodiment, the cloud provisioning system and the Management Portal 100 can enhance the user's experience via features such as:

IP Traffic: Netflow Advanced IP Traffic and Flow Information

Monitoring: SNMP Monitoring Information and Alerts Information

Logs: CPE and Concentrator Log Information

Tickets: Ticket System Information

Device Info: CPE's, Concentrators, Route Servers, Application Servers

IPAM: IP Address Management Information and Statistics

Installation: Installation and Configuration Information and Statistics.

The Cloud Based Network Management System

As described in this disclosure, one or more CPE devices or other types of network equipment can be linked to one or more network connected server or cloud concentrators (CC). The CPE devices and the server or cloud concentrators can form a network overlay, connected to a plurality of wired or wireless networks ("multiple networks"), and may provide improved network performance (including using link aggregation). The CPE devices or other types of network equipment may include, without limitation, routers, switches, load balancers, physical and/or virtual computing equipment such as servers, desktops, terminals, storage area network devices, and so on.

A Cloud Based Network Manager (or simply "Network Manager") 140 as shown in FIG. 2E may also be referred to as cloud provisioning services 140. As shown, the Network Manager 140 can be operably linked to one or more network servers and/or network overlays (including multi-POP clusters), implementing one or more cloud based network management functions that enable the deployment and management of network solutions, which in real time (or near real time) selectively uses and/or manages the multiple networks, including data paths, communications resources, upstream providers, and other network decision points. The Cloud Based Network Manager 140 may be accessed by one or more authorized users using a computer device that connects to the Cloud Based Network Manager (or "network manager") 140 via a Management Portal 100 using a network connection. The Cloud Based Network Manager 140 can facilitate deployment and management of network solutions, regardless of particular networks used to carry data packets or the geographic location of senders/recipients. In an embodiment, the Network Manager 140 provides a software defined networking solution.

As used herein, software defined networking solution relates to (a) the capacity of removing physical network switch management and capabilities from the hardware, and providing this capacity using software, based on a custom Application Program Interface (API) that connects to hardware elements, and (b) the capacity of removing switch logic and control from hardware. More specifically, the Cloud Based Network Manager 140 can enable the decoupling of control plane from data plane on network switches or routers, and can further enable replacing of the control plane with a software controller having an interoperable and/or customizable API.

Network communications may be managed through software components that connect to network components (e.g., switches or routers) via an API, rather than middleware or firmware on those network components. Consequently, the cloud provisioning technology and the associated Cloud Based Network Manager 140 disclosed herein provide virtualization, in software network components, of network equipment or elements such as physical switches and routers. Therefore, the Cloud Based Network Manager 140 can also be referred to as "software defined network manager" that operates in the cloud.

The cloud provisioning technology and the Cloud Based Network Manager 140 disclosed herein may be implemented for any type of network configuration, including a network architecture without network aggregation/bonding technology.

In an embodiment, a Cloud Based Network Manager 140 can be an application that communicates with various network and/or business entities such as disparate collectors, alerting systems, log file systems, sales, provisioning, and ticketing systems, creating a more powerful and centralized control centre and visualization for users. In addition, it may also monitor and communicate with routers, switches, load balancers, physical and/or virtual computing equipment such as servers, desktops, terminals, storage area network devices. The system has the ability to add Operations Support Systems (OSS) in the same manner and can dynamically configure/reconfigure devices such as the CPEs, switches, or routers using custom or open API's. As mentioned, customers and administrators may access the Manager via a Management Portal 100.

As shown in FIGS. 8A, 8B and 9, a Cloud Based Network Manager 140 can treat existing Simple Network Management Protocol ("SNMP") and Netflow monitoring and collection systems as third party collectors that can facilitate alerting services on the third party system or within the Management Portal 100. The system can optionally layer Business Process Management and Intelligence to setup more advanced logic for alerts and troubleshooting tools.

In one embodiment, the NetFlow system can collect IP traffic statistics from all Concentrators (i.e. CCs). The data can be uploaded to the a persistent data store or database 149 operably connected to the Network Manager 140, at which the traffic analytics can be conducted. For example, each CC may send netflow data to a netflow collector, which is operably linked to a central SCN data store 149, as shown in FIG. 16A. The Management Portal 100 can access the database 149 to display various traffic views. For instance, a bandwidth utilization based on a port or protocol may be displayed, which can aid operators in diagnosing overuse of particular services or ports.

The Management Portal 100 may provide many views depending on predetermined settings and/or the role of the user (e.g. Partner, Customer, Administrator, etc.). The Portal 100 may further provide automatic provisioning of network architecture in accordance with some aspects, as described in this disclosure.

In an embodiment, the Network Manager 140 can aggregate and parse one or more categories of data below from multiple data sources, and provide a corresponding Network View via Portal 100, which can provide:
  SNMP monitoring system/SNMP collector information
  Netflow collector/analyzer collecting advanced IP traffic information
  ticket system gathering last known ticket/support activity summary
  live data from a CPE device for real-time on-device statistics
  device configuration information from a configuration database and live devices (routers, switches, servers, etc.)
  determine and present relevant log data from centralized logs database
  produce a QoE (Quality of Experience) score based on the information above In an embodiment, the Network Manager can aggregate and parse data from multiple data sources, and provide a corresponding Device View via Management Portal 100, which can provide:
  SNMP monitoring system/SNMP collector information
  Netflow analyzer collecting advanced IP traffic information
  ticket system gathering last known ticket/support activity summary
  live data from a CPE device for real-time on-device statistics
  device configuration information from a configuration database and live CPE
  determine and present relevant log data from centralized logs database
  produce a QoE (Quality of Experience) score based on the information above In one embodiment, instructions embedded in each service check can use established rules for when services should be assigned a status including 'Critical', 'Warning', 'Unknown' or 'OK'. For instance, service checks can be displayed normally, but when a service check is not able to be completed, a status information can be filled with the last returned result and the status of a Home-POP link can be indicated to be OK. The following is an example of a CPE service check logic:

| CPE Service Check Logic Example | | |
| --- | --- | --- |
| OK-SNMP Reachable | Unknown SNMP-CPE Overloaded | Sustained Unknown SNMP |
| Lower-Link Check | Return normal check: "OK: Line1 Connected" | Return OK status, ascertained by the Home-PoP ping status. Previous/ Last returned status of the check is displayed | Display an Unknown status, instead of the de factor 'Critical' status. The last returned SNMP result is displayed; no e-mail alert. |

The Network Manager 140 can include a data logger or a data collection utility 143 that collects and logs network performance data, and then stores the network performance data to a centralized or distributed log database. The Network Manager 140 can further determine and present relevant log data from the centralized or distributed log database. A variety of data may be collected from different systems, in different data formats or structures. The Network Manager 140 can aggregate and process all the data for further analyzing. In some embodiment, the centralized log database may be central SCN database 149.

The Network Manager 140 can also include an analytics layer (e.g. network performance analysis utility 145) that is configured to analyze the network performance data stored in a database (e.g. central SCN database 149). For example, network performance analysis utility 145 can generate network performance scores (e.g. QoE) in real time or near real time.

The Network Manager 140 can further include a network configuration utility 147 for configuring or reconfiguring various components and network links, e.g., client site network component or CPE 124, network server components or CC 110. The network configuration utility 147 may also perform a variety of services such as monitoring, provisioning, or initiation of network overlays 126, 129, network paths, client site network components 124, network server components 110, access points, point(s)-of-presence 130, and so on.

The Network Manager 140 can reconfigure, through the network configuration utility 147, network paths using the network overlay 126, 129 based on a variety of factors including log data and/or network performance data gathered in real time or near real time.

The Network Manager 140 can further take corrective action based on application of predictive analytics.

In addition, there may be an API on the CPE devices—information on the CPE may be recorded and extracted live, and therefore users do not need to log into the CPE, either for provisioning purposes or management purposes. This is because cloud to machine transactions are being used, as opposed to machine to machine, or user to machine. As described elsewhere in this disclosure, a Management Portal 100 can be the user interface to display a variety of information to facilitate automated provisioning. That is, CPE devices can be initiated, configured, and deployed automatically into the cloud based Management Portal 100.

Figure 14:
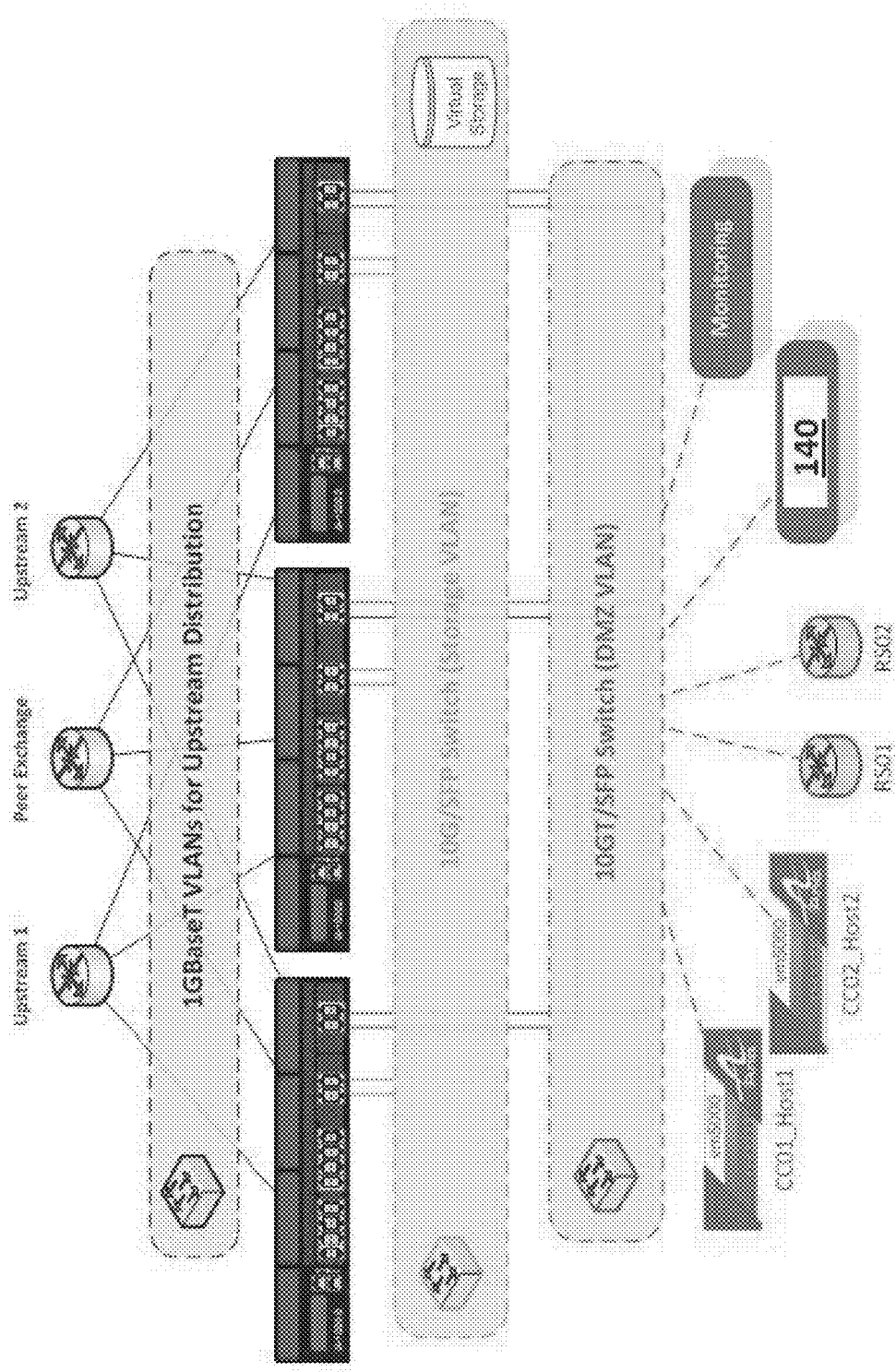
FIG. 14 illustrates various architecture components of a Cloud Based Network Manager, exemplary of an embodiment.
Figure 15:
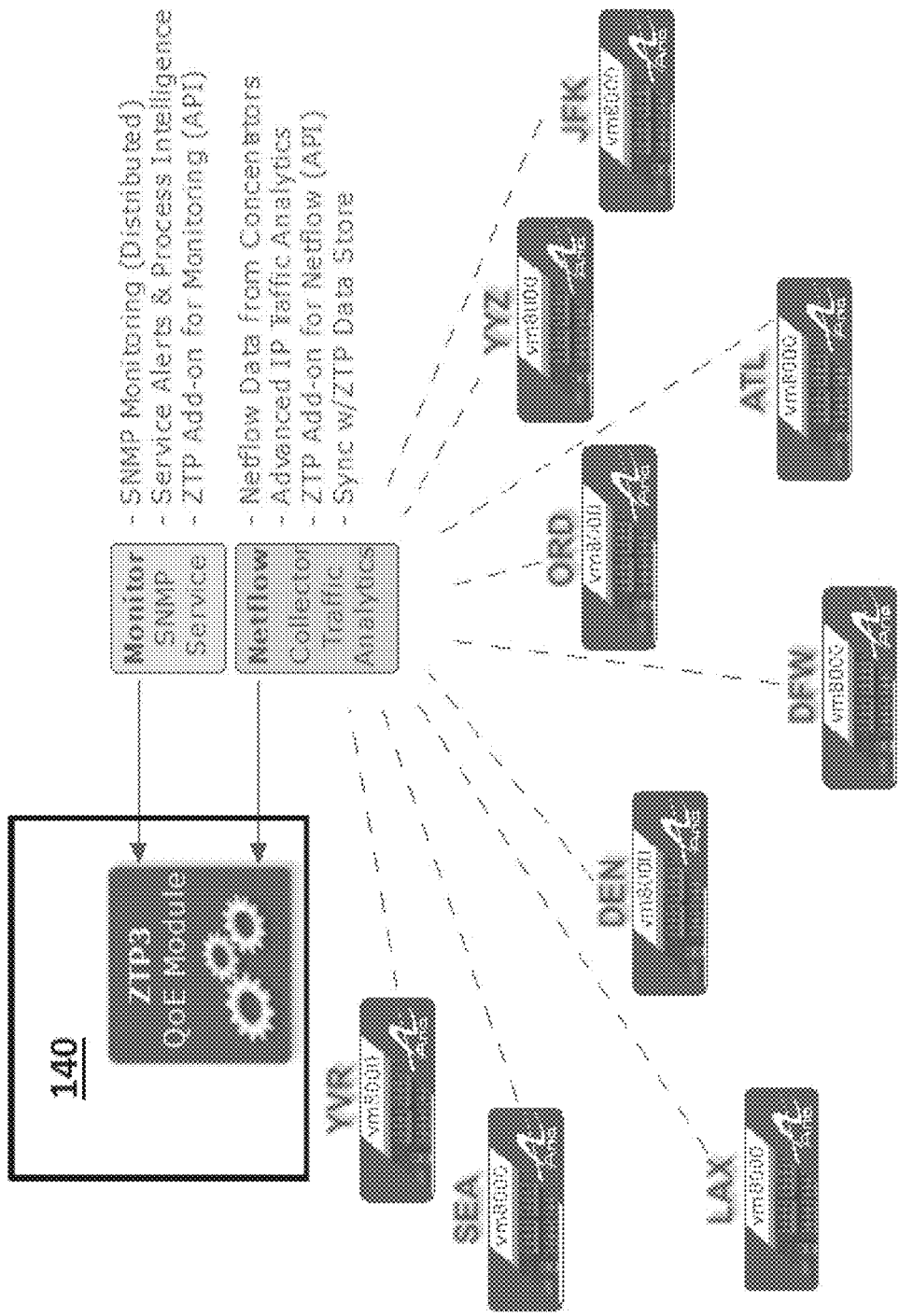
FIG. 15 illustrates additional architecture components of a Cloud Based Network Manager, exemplary of an embodiment.

As shown in FIGS. 14 and 15, the Cloud Based Network Manager 140 application implemented on one or more servers may be connected to a plurality of network or system entities, facilitating monitoring of various network performance data such as SNMP and Netflow data. The SNMP and Netflow collector infrastructure may include distributed collectors and SQL conversion.

Generally speaking, Netflow collectors (or CC) can use UDP for transport, which may or may not be reliable over the Internet. In another embodiment, as illustrated in FIG. 16A, Netflow collectors may be installed at each POP to avoid losses and may use PostgreSQL client on each collector to inject records directly to central SCN data store 149.

In an embodiment, raw files can be stored on cloud or Netflow collectors for a period of time. For example, raw files can be stored for 2 to 3 days. In another embodiment, raw files may be stored for as long as needed.

Netflow collectors, sometimes as part of a data collection utility 143, can run nfcapd from nfdump package, which can run specific command every time a new file is created.

Specific commands can be scripted using nfdump capability to export data to CSV as intermediate format and then import CSV to SQL using postgresql client. Alternatively, as another example, a Perl (or other scripting language) module can be implemented to work with nfdump data to convert and inject it to SQL directly in single program.

In an embodiment, the Cloud Based Network Manager 140 can provide automatic provisioning of CPEs, CEs, server concentrators and POPs for a variety of purposes such as to add sites, or add or modify network services to existing sites, and so on.

In an embodiment, the Cloud Based Network Manager 140 can streamline the deployment of multi-site network solutions using zero touch provisioning (ZTP). ZTP may enable smooth deployment of network solutions without physical access to network components, where normally access to at least some network components would be required.

In an embodiment, the Cloud Based Network Manager 140 can provide a cloud based provisioning system that enables deployment/management using an "SDN type" management interface.

In an embodiment, there is provided a cloud and software based network management solution (e.g. Cloud Based Network Manager 140 and Management Portal 100 interface) that does not require physical integration into network infrastructure in order to improve performance, by applying selectively performance improvement strategies in real time or near real time. The Cloud Based Network Manager provides a software-defined networking solution.

In an embodiment, the Cloud Based Network Manager 140 can combine, configure or reconfigure proximal aggregation at client sites, and multi-POP across distal sites, in order to improve network performance.

The Cloud Based Network Manager 140 can utilize data analytics, including predictive analytics, to improve Quality of Experience (QoE), across a multitude of possible communication links. The network overlay, as described above, can function as a data collection network that collects real time or near real time network performance data from various network points and communication links associated with the solution. In addition or as an alternative, a data collection utility 143 may be implemented to collect data in real time or near real-time from various network points such as CPE devices, disparate collectors, alerting systems, log file systems, sales, provisioning, and ticketing systems, creating a more powerful and centralized control centre and visualization for users. In addition, it may also monitor and collect data from routers, switches, load balancers, physical and/or virtual computing equipment such as servers, desktops, terminals, storage area network devices.

A database stored locally or on cloud data storage device can be continuously updated with information from the data collection network and this database (e.g., central SCN database 149) can be queried by a network performance analysis utility 145 so as to generate dynamically analysis data relevant to improving configuration of communication links on the fly, for example by modifying the network paths that carry packets, by modulating communication link aggregation dynamically, based on real time or near real time performance of one or more networks or paths in an aggregated link.

An aspect of the data analytics can include analysis of real-time, near real-time or historical data that can predict network performance issues which may affect network performance, including QoE. The data analytics (e.g. network performance analysis utility 145) may apply one or more predictive algorithms for predicting network performance issues such as link failure.

In another aspect, the network performance analysis utility 145 can use pattern recognition and machine learning techniques to generate network performance insights. The resulting insights may be used to train the predictive algorithms. This may occur in real time or near real time, thus addressing dynamic factors affecting network performance.

The network performance analysis utility 145 can implement data science techniques to managing network performance, without the need for integration into the network infrastructure of any network. This allows the network management solution to intelligently manage selective access to multiple networks in order to provide improved performance while utilizing available resources efficiently.

The network performance analysis utility 145 can be capable of processing a great volume of network data in real-time or near real-time, applying big data for the purposes of network management and improvement of network performance. In particular, the system can be configured to receive aggregation of data across different network management systems, and also automatically aggregating across multiple points across a network (e.g. through a bonded/aggregated connection).

The network performance analysis utility 145 can use network performance insights to build rules dynamically for addressing network performance issues.

In an embodiment, there is an intelligent network implemented firewall that utilizes the architecture described, and the network performance analysis utility 145 to detect and respond to network attacks, or network vulnerabilities (as they emerge) to network attacks.

The network management solution (e.g. Cloud Based Network Manager 140 and Management Portal 100) provide advantages particularly to multi-site customers that require WAN, Internet, and voice communication solutions, and converge between these communications.

In an embodiment, automatic provisioning of the network architecture and its associated components (e.g. CPEs, CEs, server concentrators and POPs) may be performed separately from network management.

In another embodiment, the network management solution (e.g. Cloud Based Network Manager and Management Portal 100) may offer the following services to the users: network management (including traffic management, alerts), managing sites (IPAM and provisioning, installation and configuration), and network performance support. For example, a Netflow database on data storage device may allow a user to see a screen that shows the "top ten talkers" in a user group (see. e.g. FIG. 18).

In another embodiment, aspects of the database storage architecture enable logging of information, in real time or near real time, from multiple sources and fast retrieval, as well as facilitate efficient analysis across different sites and so on.

When a user wishes to manage a site or a device, or monitor a site or device, the user may need a monitoring solution that pulls information from the relevant devices, such as a router etc.; or the user would have access to a platform that collects information from different devices, such as Netsuite. A platform solution such as Netsuite may allow the users to see information, across different devices. However, to actually initiate changes, a user normally needs to use a separate tool to log into each individual device and actively manage it. In contrast, the architecture in accordance with embodiments described in this disclosure associates a device (e.g. a CPE) with an API, and enables logging information in the cloud, where the API allows access to information but also control of various network components.

In an embodiment, the Cloud Based Network Manager 140 can connect to relevant links in real time and pull appropriate information, then create a single view in the Management Portal 100 that can show relevant information for a selection of devices. For example, the Portal 100 can generate advanced traffic management analytics.

In another embodiment, the Cloud Based Network Manager 140 can include an IPAM management system that simplifies workflows. For example, IP addresses may be generated and/or stored as an "asset" in the inventory management system.

Figure 17:
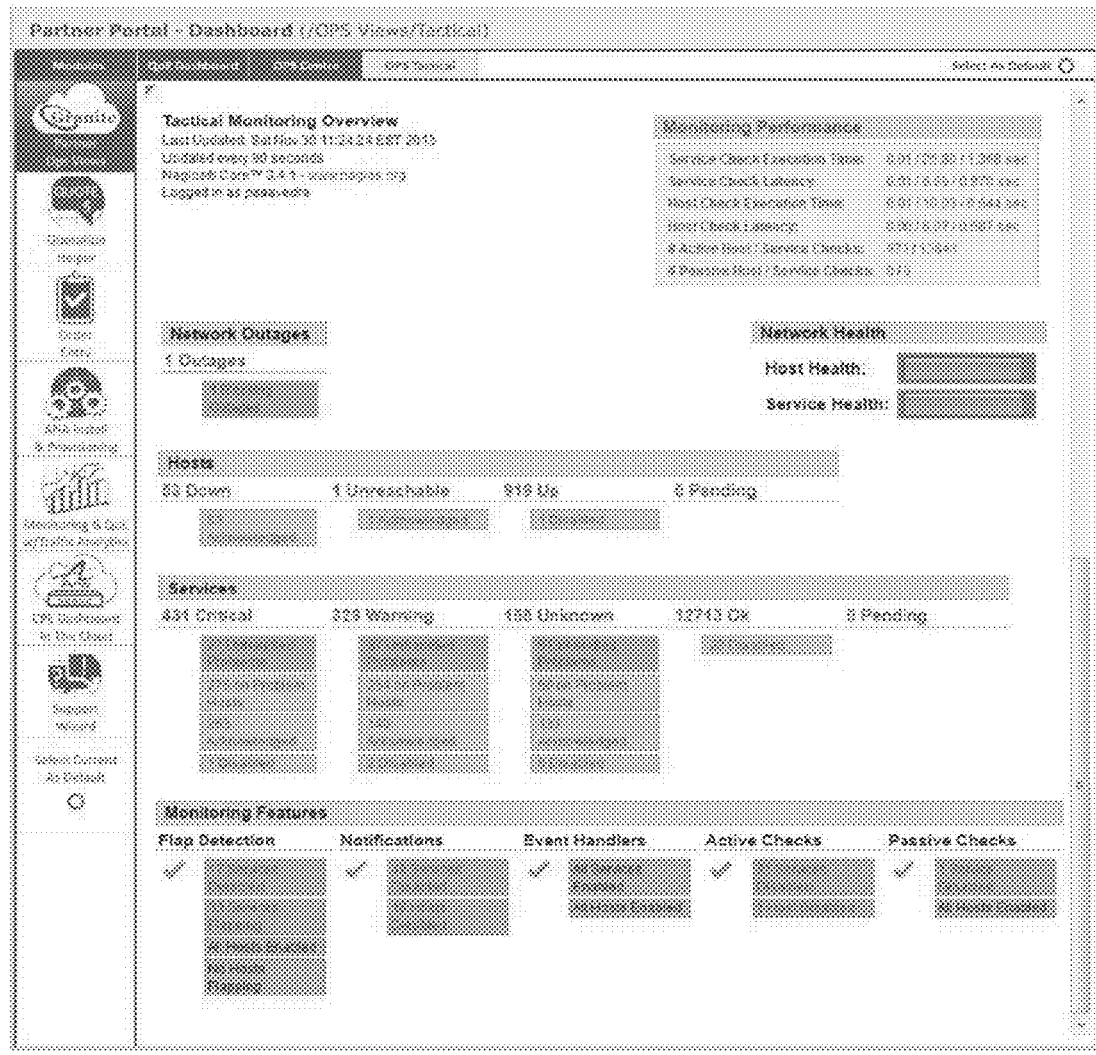
FIG. 17 illustrates a view of a Management Portal as provided by a Cloud Based Network Manager, exemplary of an embodiment.
Figure 18:
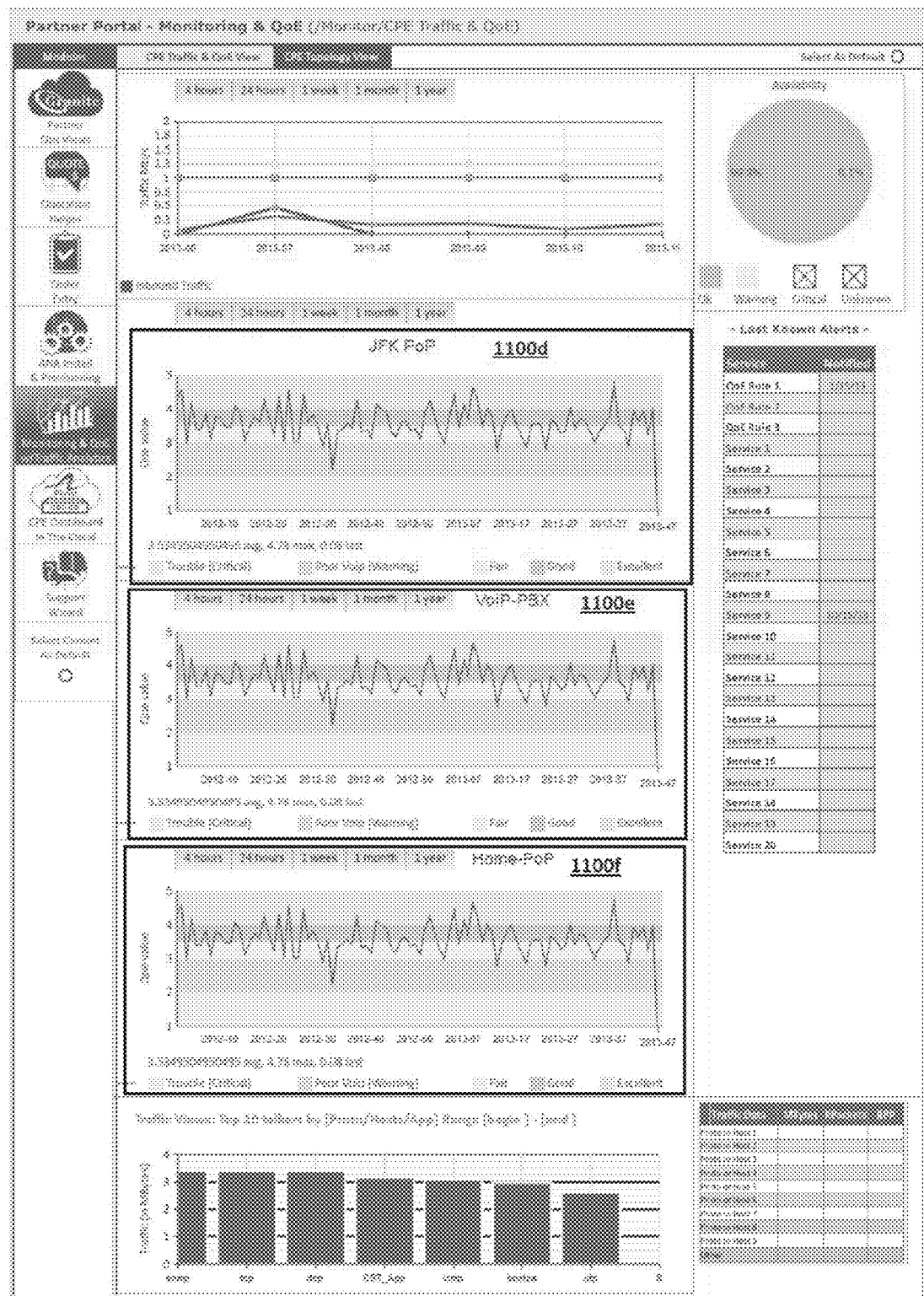
FIG. 18 illustrates another view of a Management Portal as provided by a Cloud Based Network Manager, exemplary of an embodiment.

FIGS. 17 and 18 illustrate example views of the Management Portal 100 as provided by a Cloud Based Network Manager 140 exemplary of an embodiment. In particular, FIG. 17 shows a tactical monitoring view of a particular network. As can be seen, performance of the network and its associated components are monitored in real-time or near real-time. For example, Network Outages, Network Health, Host Health, Service Health, Hosts, Services, and so on are viewable parameters.

FIG. 18 shows a Monitoring QoE view of a network provided by the Management Portal 100. In an embodiment, VoIP and Data quality from the CPE device to the PBX or Application server destinations may be monitored and measured to ensure quality of service.

In an embodiment, the Management Portal 100 may be configured to present QoE charts to provide visualizations of real time and historical performance. Such charts may provide a support team with end-to-end situational awareness, so problems may be quickly identified and dealt with. This may accelerate troubleshooting and repairs. In an embodiment, the Management Portal 100 can present a set of integrated graphs, reports, and tests. In an embodiment, the Management Portal 100 may provide a set of remote management tools that enable a customer or a system administrator to recalibrate and reconfigure devices to fix problems. In an embodiment, Management Portal 100 may be configured to provide collected data and associated analytics to a user-selected Network Management Platform.

In one exemplary embodiment, a Quality of Experience or QoE score may be synchronised to a subjective Mean Opinion Score (MOS) standard. Calculation of QoE may be based on latency, jitter or loss values, thereby making the QoE value a more robust indicator for link quality. In one instance, for lower-link QoE, QoE mechanism may be added to network aggregation links (e.g., at a MDPS or "Multi-Directional Pathway Selection") to obtain live link QoE information. For another example, QoE-check may be conducted via SNMP, where CLI commands may be added to networking node, so that QoE tests may update system SNMP OID for retrieval by any SNMP monitoring system to produce QoE results, including QoE graphs.

In one embodiment, MDPS is a pre-emptive network failover technology that generates or facilitates self-healing last-mile connection with no dropped VoIP calls and no IP address changes. All sessions and QoS configurations survive when any connection fails to ensure the user's Quality of Experience is not comprised from individual link outages. MDPS may be implemented in the following aspects: automated link removal and recovery, pre-emptive failover/bi-directional control, false positive checking, no dropped VoIP calls on failover, lossless data/TCP failover, one ping loss average<1 sec outage (e.g. 200 ms-2400 ms).

Figure 11A:
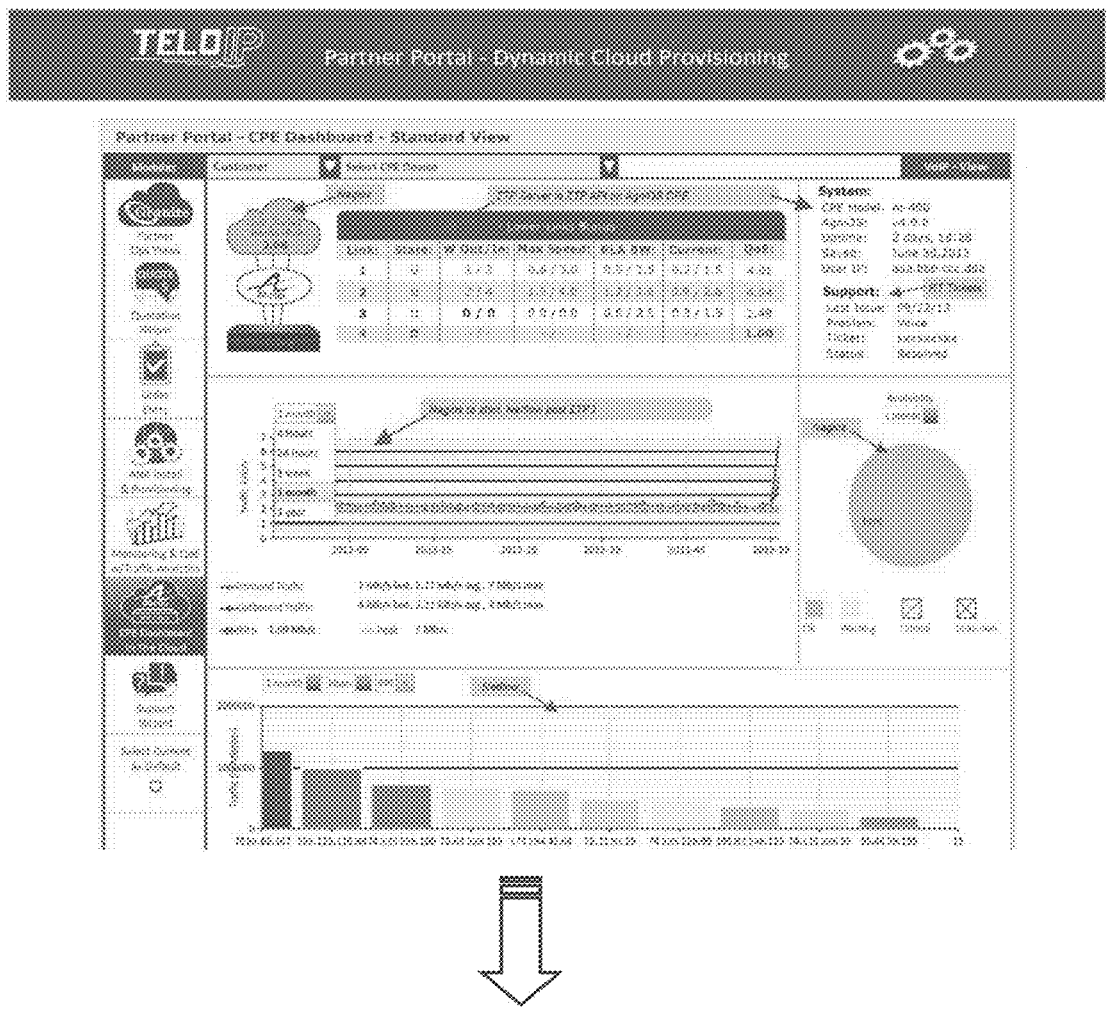
FIG. 11A illustrates a first portion of a CPE Dashboard standard interface shown on a Portal as provided by a Cloud Based Network Manager, exemplary of an embodiment.
Figure 11B:
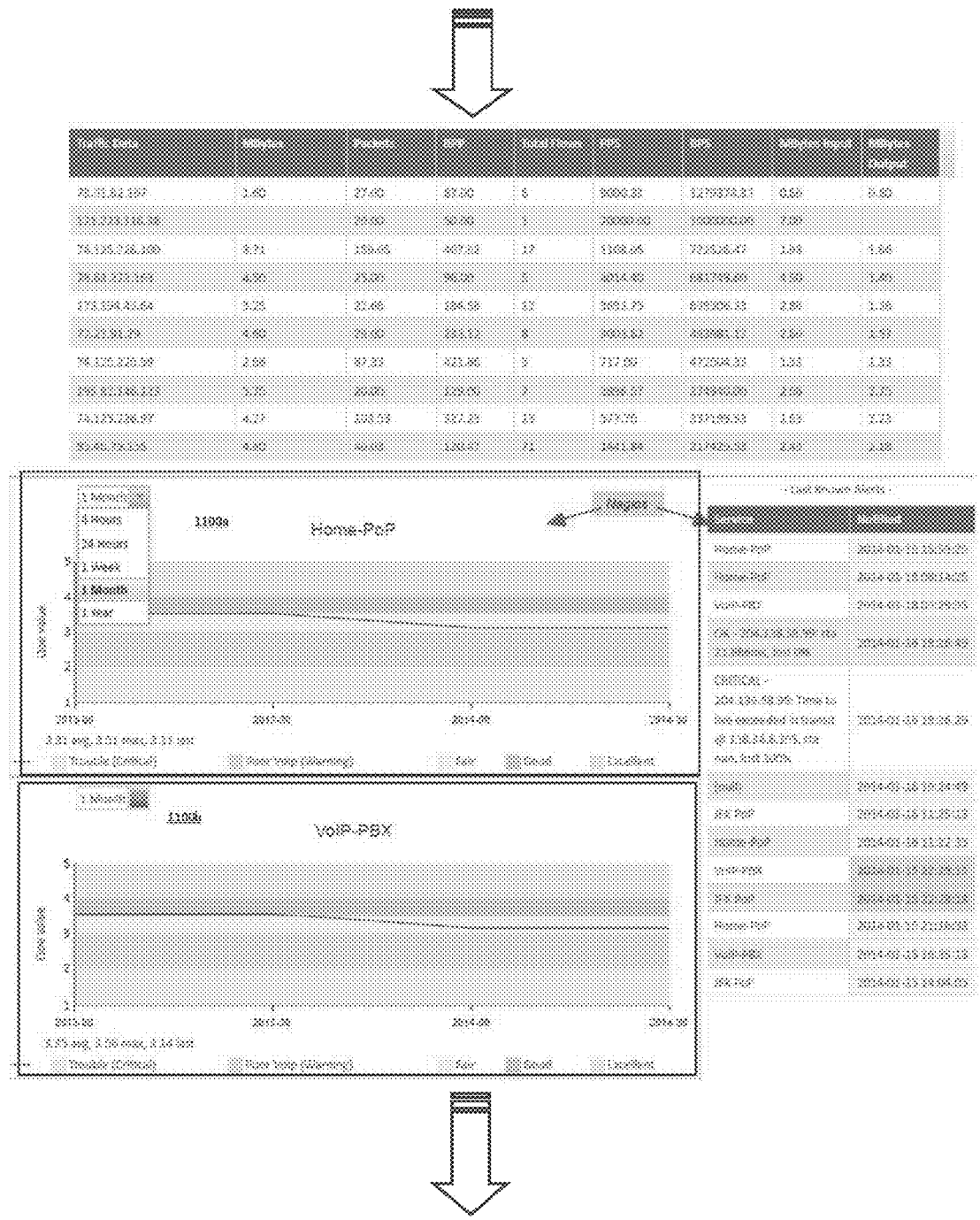
FIG. 11B illustrates a second portion of a CPE Dashboard standard interface shown on a Portal as provided by a Cloud Based Network Manager, exemplary of an embodiment.
Figure 11C:
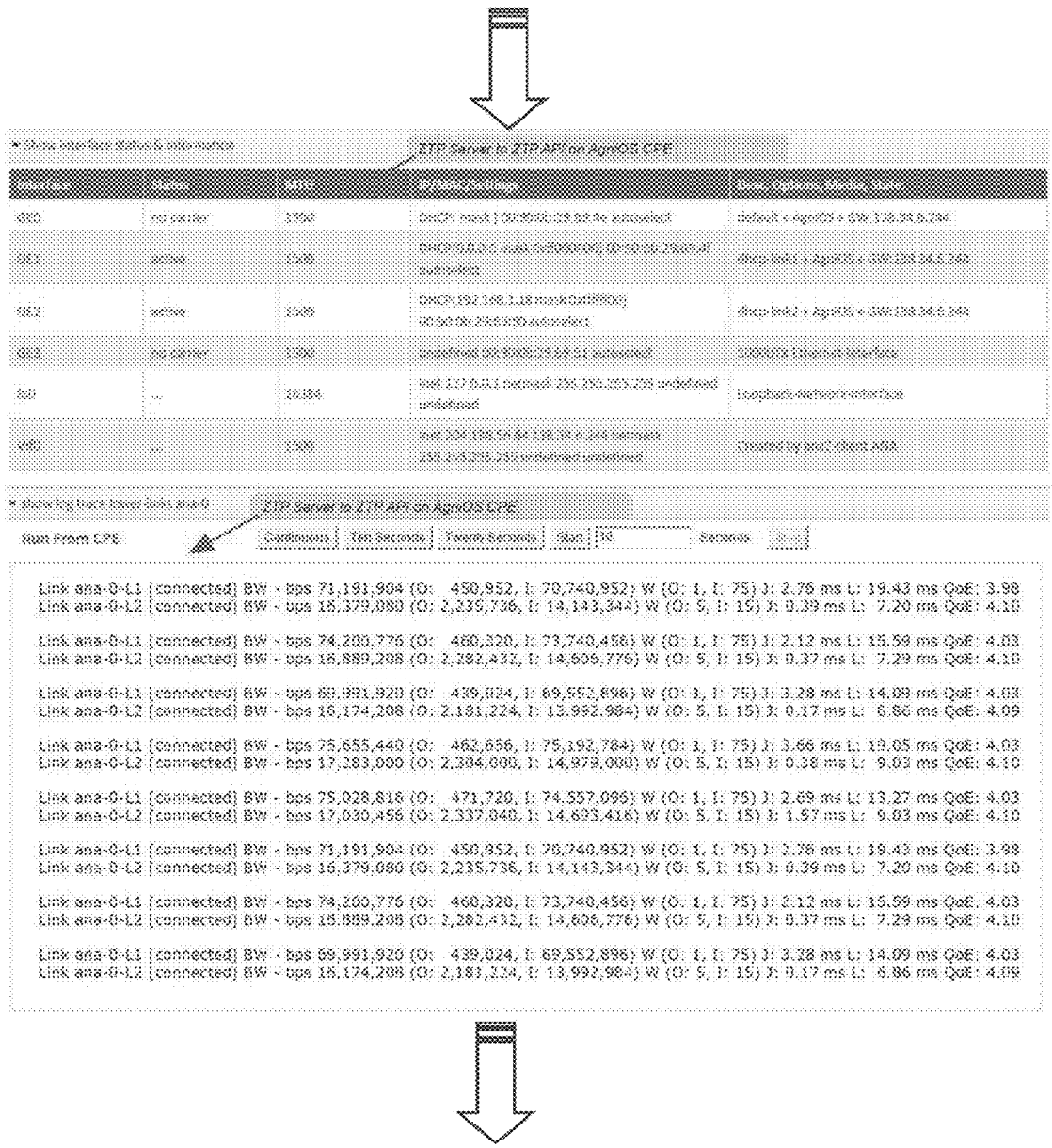
FIG. 11C illustrates a third portion of a CPE Dashboard standard interface shown on a Portal as provided by a Cloud Based Network Manager, exemplary of an embodiment.
Figure 11D:
FIG. 11D illustrates a forth portion of a CPE Dashboard standard interface shown on a Portal as provided by a Cloud Based Network Manager, exemplary of an embodiment.
Figure 12A:
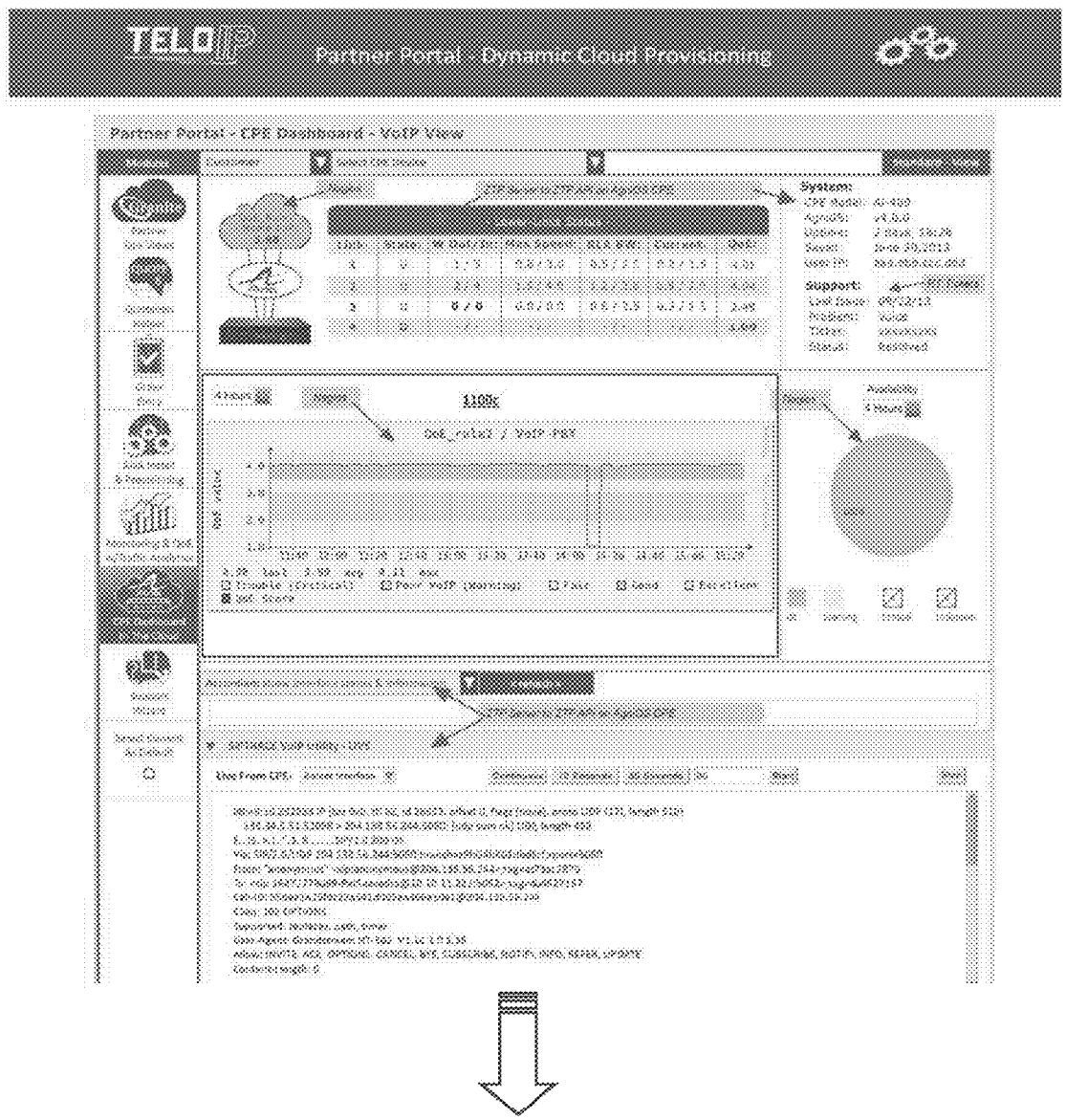
FIG. 12A illustrates a first portion of a CPE Dashboard VoIP interface shown on a Portal as provided by a Cloud Based Network Manager, exemplary of an embodiment.

FIGS. 11B, 12A and 18, 1100a-1100f demonstrate various exemplary QoE scores for VoIP and Data, as provided by Nagios. For example, QoE score graph (or simply QoE graph) 1100a of FIG. 11B illustrates QoE values for a Home PoP network over a selected period of time, and 1100b illustrates QoE values for VoIP-PBX for a selected period of time. These QoE graphs can also show the qualities of the QoE values such as "Trouble", "Poor", "Fair", "Good" or "Excellent", and each of the qualities may be represented by a different colour code or colour scheme, as shown in 1100a and 1100b. Referring now to FIG. 12A, 1100c illustrates another QoE graph for VoIP over a period of 4 hours. Referring now to FIG. 18, 1100d shows a QoE graph for a selected PoP (JFK), 1100e shows a QoE graph for a selected VoIP-PBX network connection, and 1100f shows a QoE graph for a Home-PoP network.

In one embodiment, Nagio may be used to supplement the data gathered by the Network Manager 140. For example, Nagio may be used to monitor uptime and service alerts for customer premises equipment (CPEs). The Nagio system may use RRD files to generate traffic and service monitoring graphs. In some exemplary implementation, all service checks and alerts via Nagio are polled in real time to a Nagios staging server, which can be used to reduce risk of abuse on the production server that is performing active SNMP checks.

In some embodiment, the Portal 100 enables users or operators to view per-second statistics for bandwidth utilization, jitter, latency and QoE.

These VoIP (Voice over IP) and Data can be for ERP (Enterprise Resource Planning) applications, ticketing systems, or for any other application. For example, if the QoE score is in the range of one (1.0) to two (2.0), it may indicate a troubled circuit or link. If the QoE score is in the range of two (2.0) to three (3.0), data transmission may be acceptable but VoIP may be poor. If the QoE score is in the range of 3.0 to 3.5, it is fair quality, and may be sufficient quality for voice over IP. The system can further determine and show the QoE score up to ranges of 3.5 to 4, or 4 to 5. In an embodiment, lower link QoE scores can demonstrate to a user, in real time or near real-time, the per second snapshot of the quality of experience of the links of a device. The snapshot may act as an indicator representing more than just latency jitter and loss. This QoE tool can continuously collect information, and generate a QoE score graph on demand, such as when requested by a SNMP system or a CPE device.

In an embodiment, VoIP tools may be implemented and provided to allow operators to analyze voice packets during active calls at the customer site. A voice call (with the approval of the end-client) can also be captured for analysis and record keeping (e.g. customer service centres).

VoIP capabilities may be automatically provisioned and configured. For example, during an initial CPE configuration, the cloud management system may automatically match bandwidth reservations to the Specific VoIP Codec. In addition, the cloud management system can include device discovery, so that VoIP phones can configure themselves virtually.

The QoE tool may be configured to measure a QoE score for each Session Initiation Protocol (SIP) session on a VoIP communication link or device can be measured with a QoE Score. Further, detailed latency, jitter and packet loss measurements may be presented by the QoE tool for each session.

In an embodiment, the QoE Tool may be configured to allow a user to record a live call as would be received by a call recipient. The recording may be played back through Portal 100, thereby allowing a user to assess the call quality from the perspective of the call recipient.

In another embodiment, saved voice analysis files may be stored for future analysis and reporting. Captured voice sessions can be shown in list form, and they can be downloaded or removed by the operator. When an operator selects a file from a list of captured voice sessions, details of the call may be made available, including Port, Codec used by each party, packets, lost packets, jitter and latency.

Figure 19:
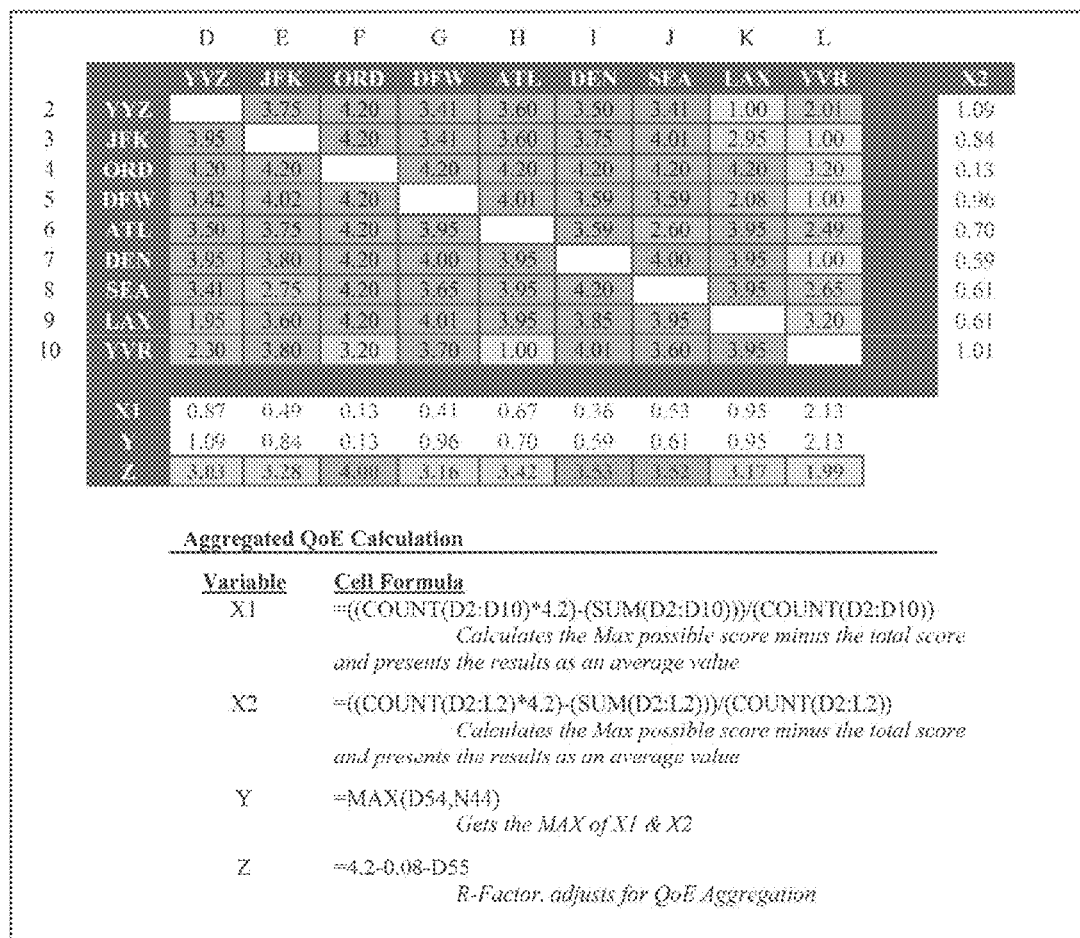
FIG. 19 illustrates an example method of aggregated Quality of Experience (QoE) calculation, exemplary of an embodiment.

Referring now to FIG. 19, a method of determining aggregated QoE is shown. One or more QoE values for a network path from different points or locations (e.g. YYZ) can be used to generate an Aggregated QoE score as follows:

| Aggregated QoE Calculation | |
|---|---|
| Variable | Cell Formula |
| X1 | =((COUNT(D2:D10)*4.2)-(SUM(D2:D10)))/(COUNT(D2:D10))<br>Calculates the Max possible score minus the total score and presents the results as an average value |
| X2 | =((COUNT(D2:L2)*4.2)-(SUM(D2:L2)))/(COUNT(D2:L2))<br>Calculates the Max possible score minus the total score and presents the results as an average value |

| Aggregated QoE Calculation | |
|---|---|
| Variable | Cell Formula |
| Y | =MAX(D54,N44)<br>Gets the MAX of X1 & X2 |
| Z | =4.2-0.08-D55<br>R-Factor, adjusts for QoE Aggregation |

As shown in FIG. 19 the "Z" value/row for the top down YVR readings in column L for X1 can indicate many failure readings and therefore the score for YVR ends up in pink with 1.99 QoE Score being the lesser of X1 vs X2. In addition, for ORD in column F and row 4 we can see a score of 4.00 showing excellent QoE in blue shade.

Figure 20:
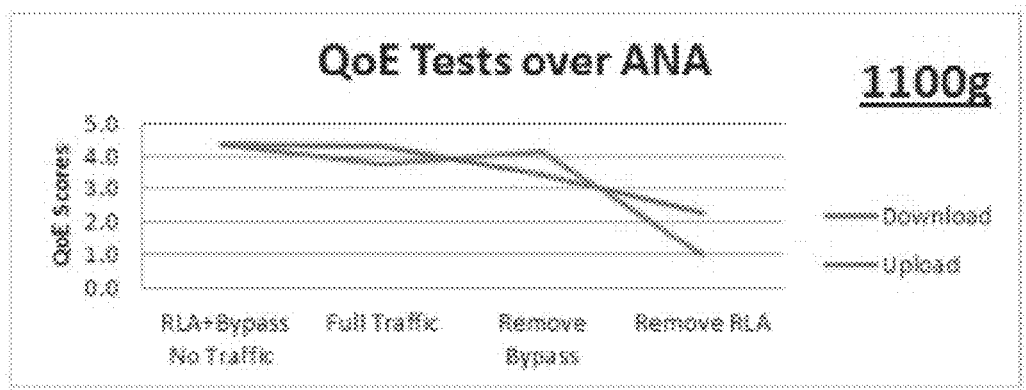
FIG. 20 illustrates a QoE test score graph over a bounded network, exemplary of an embodiment.

As shown in FIG. 20, a QoE graph 1100g shows different QoE values for different RLA (Rate-Limit-Avoidance) settings. As shown, the QoE value drops significantly when RLA, bypass, or both is removed and maximum bandwidth is used on the lower links. The removal of RLA entirely for the lower-links may result in a dramatic reduction in the QoE score as bandwidth suffers high latency or jitter.

Advanced business process intelligence (BPI) may be implemented to provide means to calibrate the sensitivity of alerts and notifications based on the types of services that a Host is running. This may provide a monitoring system with intelligence to only send alerts when user QoE is at risk or is below a certain threshold.

Figure 21:
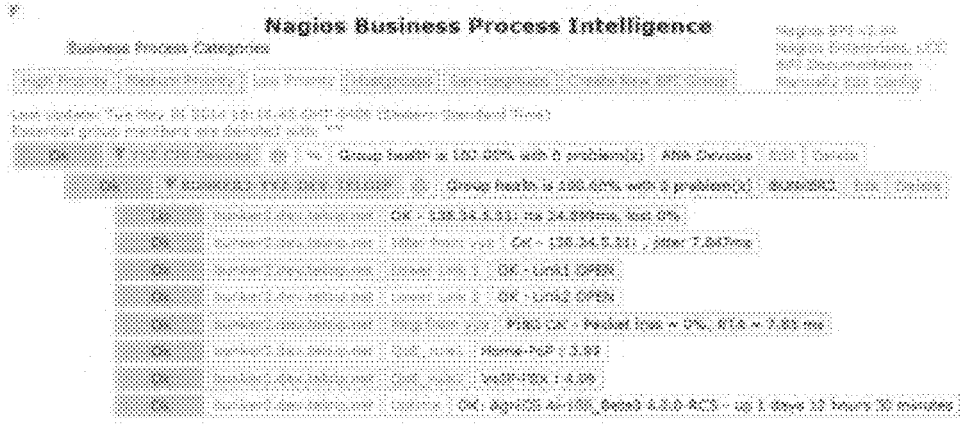
FIG. 21 illustrates an example Business Process Intelligence interface, exemplary of an embodiment.

For example, as demonstrated in FIG. 21, a BPI tool in a SNMP collector system can provide high-level view and intelligence based on an aggregated QoE score. In an embodiment, white noise may be eliminated by the BPI tool so that only meaningful intelligence is taken into consideration. Default or custom rules may be set up to indicate when an alert is generated.

Figure 22:
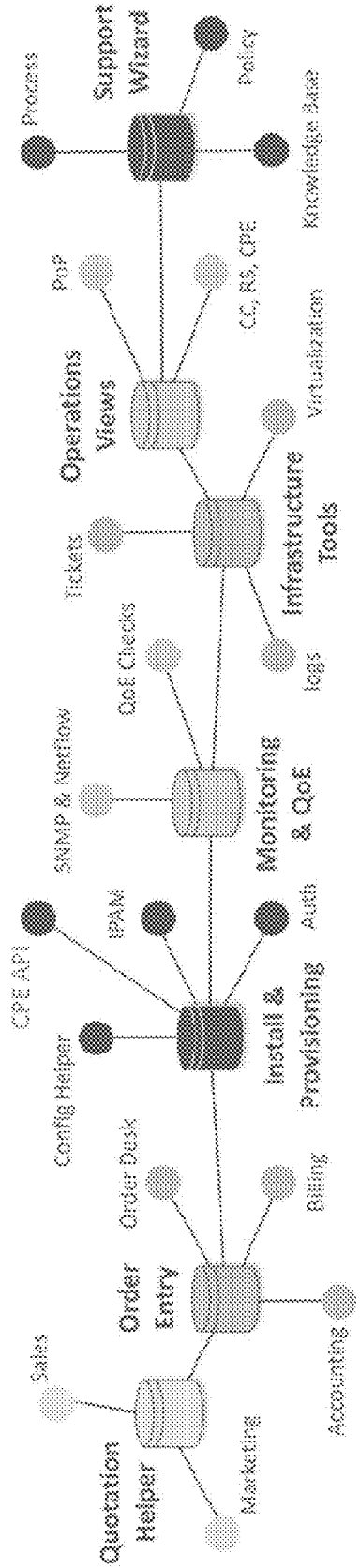
FIG. 22 illustrates Business Process Intelligence being provided by multiple data sources, exemplary of an embodiment.

FIG. 22 shows increasing business intelligence provided by multiple data sources such as Quotation helper, sales, marketing, order entry, accounting, order desk, configuration helper, install and provisioning, monitoring, and QoE, and so on. Moving from left to right through the exemplary process in FIG. 22, order entry information, IP address information, and all other appropriate information (e.g. as support, monitoring, maintenance) is entered or captured automatically from different sources such ticket systems, monitoring collectors, logs, the devices themselves, IP address management, and installation. Default or custom policies may be implemented to further filter or otherwise process the collected information, based on the desired intelligence output required.

Management Portal 100 may provide a variety of meaningful statistics and information to users. In one embodiment, the Network Manager 140 has queried the CPE database to obtain information such as IP addresses, type of CPE device (e.g. Ai100), associated URL (e.g. bunker2.dev.teloip.net), software information (e.g. AgniOS version 4, release candidate 7), network statistics (e.g. network has been up for 6 days and 21 hours, etc.), bonded/aggregated network connection status (e.g. been up for 165 hours, IP), as well as associated QoE score and any applicable rules. All of these information may be provided to users through Portal 100 interface. QoE information regarding two lower links are also presented: weights, jitter, latency, the QoE score at that moment in time. IPDE (Intelligent Packet Distribution Engine) RLA bandwidth is also shown. It is further evident that various settings may be shown. For example, information such as set to 52 meg in on Link 1, 18 meg in on Link 2, 1.593 meg out Link 1, 6.612 out Link 2, reserve bandwidth set about 500K in, 400K out, bypass rules, and so on, may be displayed as well on demand or by default.

Sample Portal User Interface

Referring now to FIGS. 10A to 10D, a Cloud Concentrator Dashboard view is shown on a Portal 100 for Partners (e.g. "Partner Portal" as an illustrative example). The Partner Portal is designed such that a user does not need to be a network administrator or professional to view or understand the data. As shown, the user can pick one or more Cloud Concentrators (e.g. YYZ, JFK, etc.) from a drop-down menu. Depending on the chosen CC(s), a variety of parameters and data analytics can be displayed in real-time or near-real time. Historical data may be shown as well. In some embodiment, on-board diagnostic tools may be provided to facilitate troubleshooting or isolating of issues.

For example, the following data may be viewed on the Partner Portal: server status, user IP, bandwidth chart, traffic statistics, Netflow data, CC connection details, underlying CPE data, network logs, and so on.

Referring now to FIGS. 11A to 11D, a CPE Dashboard standard view is shown on the Partner Portal. A user can select a CPE device he/she desires to view. Once selected, a variety of information may be collected, processed and/or displayed, such as: lower-links status, server data, traffic analytics, Netflow data, QoE values, historical alerts, interface status and information, logs for lower-links, and so on.

Figure 12B:
FIG. 12B illustrates a second portion of a CPE Dashboard VoIP interface shown on a Portal as provided by a Cloud Based Network Manager, exemplary of an embodiment.
Figure 12C:
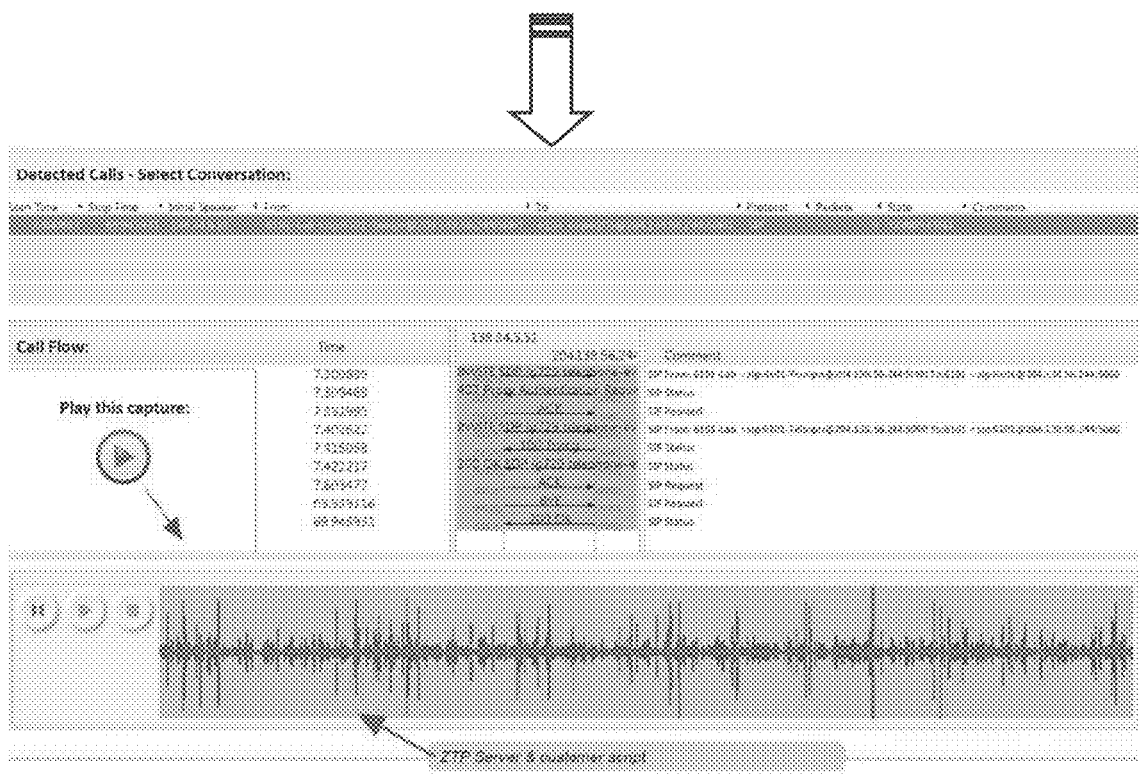
FIG. 12C illustrates a third portion of a CPE Dashboard VoIP interface shown on a Portal as provided by a Cloud Based Network Manager, exemplary of an embodiment.

Referring now to FIGS. 12A to 12C, a CPE Dashboard VoIP view is shown on the Partner Portal. Similarly to the standard view, a user can select a CPE device he/she desires to view. Once selected, a variety of information may be collected, processed and/or displayed, such as: lower-links status, server data, traffic analytics, Netflow data, QoE values, SIP trace, historical alerts, interface status and information, logs for lower-links, and so on. In particular:

(1) lower link status can be dynamically obtained from CPE device. Information can be collected dynamically from provisioning process and CPE device. The Portal can also show support status for existing tickets. A user may also open ticket from here as a link.

(2) From the perspective of the chosen CPE device, a QoE score for VoIP in the form of SNMP data can be shown. Availability in the form of SNMP data may also be shown.

(3) SIP trace can be shown (e.g. interface status and information data); a live trace of the SIP protocol may be shown in real-time or near real-time. This can facilitate troubleshooting.

(4) SIPPCAP VoIP utility can also be available—PCAP is a common tool for troubleshooting. SIPPCAP can be the alternative to PCAP. It can help the user with troubleshoot to show whether data jitter is on one end or the other. It can show packet information, routing information, can even access call itself.

Figure 13A:
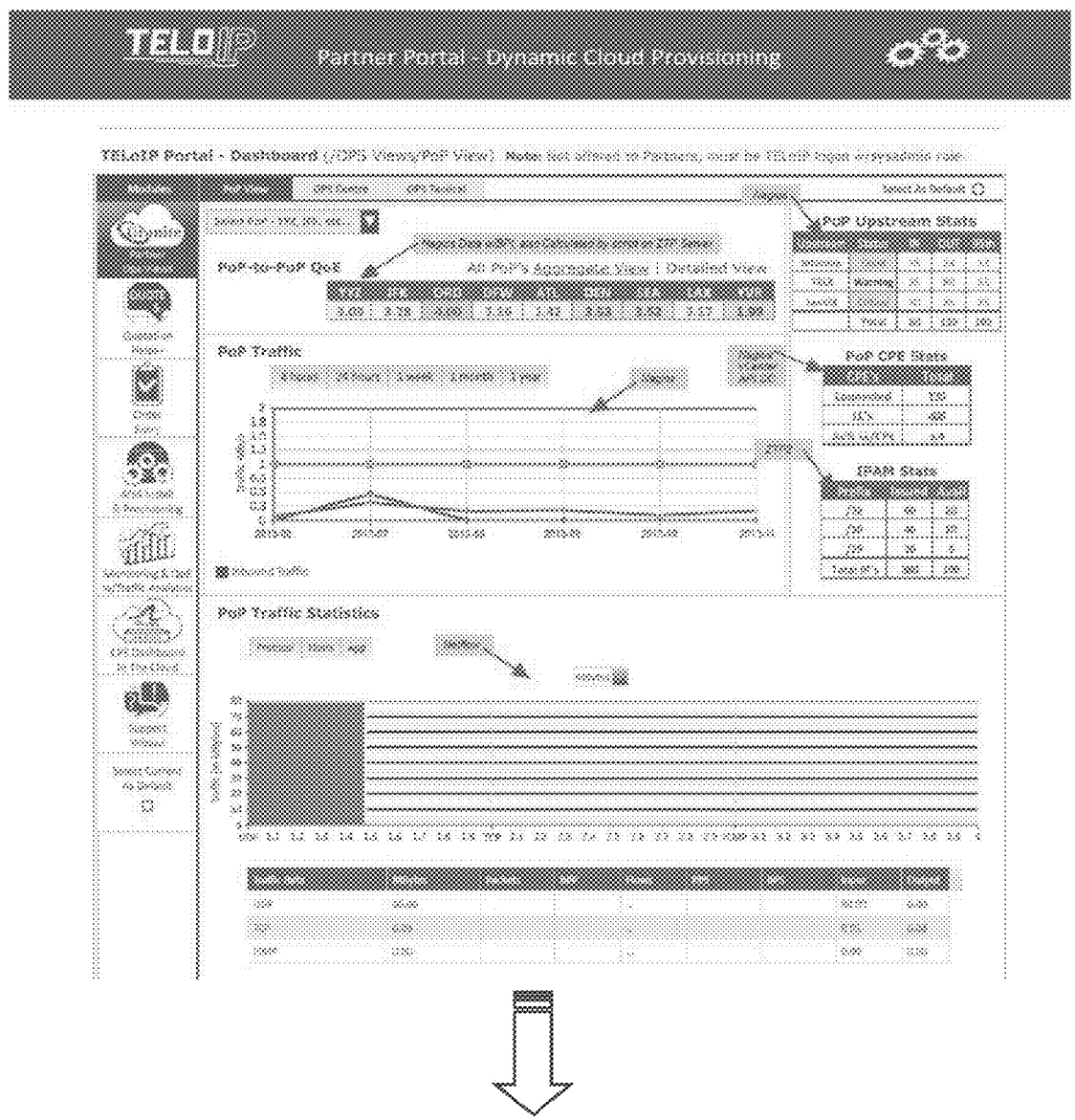
FIG. 13A illustrates a first portion of a Point-of-Presence (PoP) Dashboard interface shown as provided by a Portal of a Cloud Based Network Manager, exemplary of an embodiment.
Figure 13B:
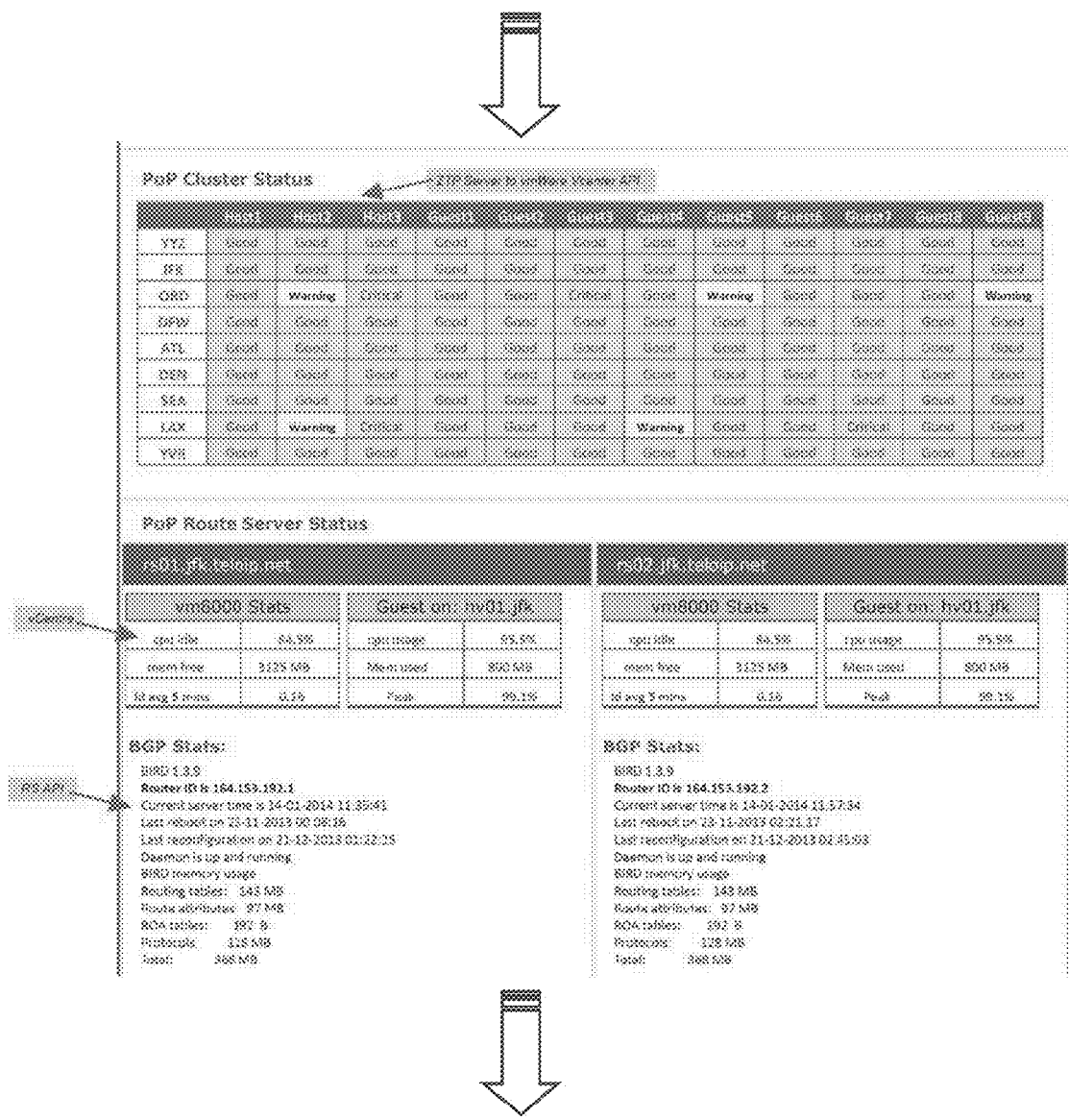
FIG. 13B illustrates a second portion of a PoP Dashboard interface shown on a Portal as provided by a Cloud Based Network Manager, exemplary of an embodiment.
Figure 13C:
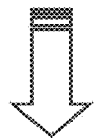
FIG. 13C illustrates a third portion of a PoP Dashboard interface shown on a Portal as provided by a Cloud Based Network Manager, exemplary of an embodiment.

Referring now to FIGS. 13A to 13C, a Dashboard view of PoP is shown. As shown, the user can pick one or more PoP (e.g. YYZ, JFK, etc.) from a drop-down menu. Depending on the chosen PoP, a variety of parameters and data analytics can be displayed in real-time or near-real time. Historical data may be provided as well. For example:

(1) PoP-to-PoP QoE: this can be determined via a unique method and algorithm, through which the system (e.g. Cloud Based Network Manager) can calculate aggregated QoE.

(2) PoP Upstream Statistics (Stats): this shows bandwidth usage and status of upstream connections for a particular PoP.

(3) PoP CPE Stats: this is a query of active CPE for the client. It can show the number of CPEs connected; the number of lower-links across; and the number of average lower-links per CPE. This for example helps in capacity planning for cloud concentrators.

(4) IPAM Stats can show issued and available IPs.

(5) PoP Traffic can show both SNMP and Netflow data.

(6) PoP Traffic Statistics can show very granular data on number of call, amount of web traffic and so on.

(7) PoP Cluster Status can show the status of each host or guest device at each CPE location. For example, VMware can be used and queries can be sent to the VMware for corresponding status update in real-time or near real-time.

(8) Route server status can show VMware stats, such as live BGP statistics and so on.

User Ordering and Installation Process

The following is an exemplary ordering and installation process for a customer and a Partner:

1. Customer decides to order the product.

2. Partner connects to their salesforce.com portal and turns the lead/quote for this opportunity into an order. This is a pre-programmed function within the Partner's salesforce.com environment. The dynamic cloud provisioning system can use the salesforce.com API to receive or retrieve the new order. This order already has much information that is relevant to the provisioning process such as site location and services requested. For example, information can be in an order entry module, or in Salesforce. Information may include for example: city, number of links, speeds expected, DSL, ADSL and so on. So provisioning information may be extracted automatically.

3. Partner goes into the ZTP order entry module and finalizes the order without the need to re-enter much of the information. This can serve as a validation and confirmation step of the order process.

4. Partner or Project Manager (PM) can be automatically assigned. The ZTP system has API connectivity with the vendor and Partner's ticketing system. The PM can now proceed to take the order through the next series of steps if required. IPAM, ZTP Installation and Configuration Modules may be accessed if appropriate. A support resource such as a Device Configuration Engineer (DCE) can be assigned. The authentication database is updated with the CPE S/N and MAC, and will now be allowed to connect once connected to any Internet service.

5. Product is shipped out of the Partner or vendor warehouse to the customer location or installer depot. This step may take place much earlier in the process as it is not dependent on any of the above items based on the automated provisioning process.

6. A Device Configuration Engineer (DCE) picks up the install when the device is connected on-site and completes the process using ZTP (Install and Config Helper). By this time the CPE has already connected to the corresponding provisioning/staging CC. Automated tools can then be run on the CPE over a secured session from the Portal 100 to the CPE using the ZTP API on the CPE. The device is moved to the Home-PoP CC and auto calibrates for the Lower-Links attached.

For example, CPE Lower-Links can be calibrated in the following aspects for maximum performance:

Quality of Service—calibrating for poor quality bandwidth region avoidance and bandwidth reservation settings for applications;

Bandwidth—calibrating to confirm delivered bandwidth versus provisioned bandwidth from the local carrier;

Failover—calibrating pre-emptive lossless failover sensitivity; and

Acceleration—calibrating on-the-fly traffic compression settings.

7. Upon completion of Installation ZTP automatically adds the CPE device to monitoring. ZTP will add the device to the monitoring system collectors such as Netflow and SNMP. The system also can create all alert criteria based on the Installation type such as Data Only or Voice and Data CPE.

8. The Partner and Customer can now see the device within the ZTP monitoring views.

9. Post Install support is connected to the Ticket System of the Partner and vendor. A wizard is used with logic from the TELoIP L1-L4 support process, which may be automated as well.

In another embodiment, the following features may be provided to a customer of the ZTP cloud provision system via the Portal 100:

Quotation Helper
Provisioning helper w/pending order status
Provisioning database for lower-links w/o costing
Accepts user input and uses existing OE/SIT/ZTP2 data
Customer Order Entry/SIT Module
Service Information Template Data Capture
Automated updates via email for order completion
Order status indicator
Install scheduler (TELoIP Resources)
Monthly order detailed reports generator
Provisioning and Installation Module (ZTP)
CPE configuration and Installation w/AgniOS API
IP Address assignment tool
Add CPE to monitoring
Installation report
Monitoring and QoE Module (Nagios+Netflow)
QoE Dashboard/Partner Portal
  Ops Centre View
  Tactical View
  CPE Views (End-User Views)
QoE Dashboard/End-User Single CPE
  QoE Graphs Views
  QoE Topological Views
Traffic Analytics and Monitoring
Host and Service Alerts
Bandwidth usage and reporting
SLA Reporting w/QoE data
CPE Dashboard (AgniOS API)
No more logon to CPE
Cloud-based AgniOS API obtains live CPE data from CPE
Initiate automatic image updates on the CPE
No configuration options (MAC, remains L2 function)
Individual CPE Firewall Management and Configuration tool w/integrated traffic and logfile data
Post Install Support Request Wizard
Questionnaire/wizard
Gathers data and charts from logs
Spawns post install support ticket In another embodiment, the following features may be provided to an administrator or operator of the ZTP cloud provision system via the Portal 100:

OPS—ZTP2 Provisioning and Installation Module
CPE configure and install w/AgniOS API (no DCE SSH)
IP Address assignment tool (IPAM module)
Automatically add CPE to monitoring
Integrated IPAM, Auth/FreeIPA, DNS
OE and ZTP2 reports for Operations
OPS—IPAM-IP Management Module
Internal Level3 Operations
ZTP2 IP address assignment tool
IPAM queries FreeIPA, ZTP also updates FreeIPA IP's
OPS—QoE Management Tools
Traffic Analytics and Monitoring (Netflow and Nagios)
Bandwidth usage billing and reporting
Per CPE, Customer, PoP, etc.
Verify BW costs from upstream providers
Establish average per Mbps cost
Trend analysis
Alerts for capacity planning
SLA management w/QoE data
PoP to PoP w/QoE Scores and BPI
CPE QoE graph and Topological Views
PoP upstream peer and upstream target QoE views
PoP health views (QoE, SNMP, and Netflow data)
Monthly Partner End-User Reports
OPS—Post Install Support Request Wizard
Wizard presents intelligent data and spawns ticket for incident resolution
Incident Reporting
ZTP Application—Role and User Management
Role based billing for ZTP features/modules/tools
Usage based billing for ZTP features/modules/tools
ZTP Application—Multi-tier ACL Relationship
Relational model using 1 to n hierarchy w/incidents:
Carrier (1 and n Partners)
Partner (1 and n Customers)
Customer (1 and n sites)
Sites (1 and n CPEs)
Devices Advantages and Use Case One or more embodiments disclosed herein may significantly improve network performance between disparate locations by leveraging network bonding/aggregation technology, but by implementing a system, method and network configuration that provides intervening network components disposed adjacent to access points so as to manage traffic between two or more sites such that bonded/aggregated connections are terminated and traffic is directed to a network backbone, and optionally passed to one or more further bonded/aggregated connections associated with a remote additional site.

The network solutions disclosed herein may be flexible, responsive, scalable and easy to implement. In an embodiment, new sites, optionally having their own CPE/concentrator can be easily added, and the network solution supports various types of multi-point network communications, and various network performance improvement strategies including various QoS techniques.

The network solutions disclosed herein may be easily updated with new programming or logic that is automatically distributed on a peer to peer basis based on the interoperation of network components that is inherent to their design, as previously described.

In an embodiment, network performance may be significantly improved over prior art solutions as illustrated in the examples provided above.

The scope of the claims should not be limited by the example embodiments set forth in the examples disclosed herein but should be given the broadest interpretation consistent with the description as a whole.

The invention claimed is:

1. A network system for improving network communication performance between at least a first client site and a second client site, wherein the first client site and the second client site are at a distance from one another that would usually require long haul network communication, the system comprising:
(a) at least one network bonding/aggregation computer system comprising:
  (i) at least one client site network component that is implemented at least at the first client site, the client site network component bonding or aggregating one or more diverse network connections to configure a bonded/aggregated connection that has increased throughput; and
  (ii) at least one network server component, configured to interoperate with the client site network component, the network server component including a server/concentrator that is implemented at an access point to a high performing network interconnected with the second client site; and
(b) a cloud based network manager comprising:
  (i) a data collection utility configured to collect network performance data from a variety of sources or network points in real-time or near real-time;
  (ii) a network performance analysis utility configured to dynamically analyze the collected network performance data in real-time or near real-time; and
  (iii) a network configuration utility configured to reconfigure at least one of: the at least one client site network component, the at least one network server component, the one or more diverse network connections, and the bonded/aggregated connection based on the analyzed network performance data.

2. The network system of claim 1, wherein the cloud based network manager comprises an electronic portal configured to display at least one of: the collected network performance data and an analysis output of the network performance analysis utility.

3. The network system of claim 1, wherein the network performance analysis utility generates data required to modify network paths in the high performing network between the first client site and the second client site.

4. The network system of claim 3, wherein the network performance analysis utility determines a network performance score based on the network performance data.

5. The network system of claim 4, wherein the network performance score is a Quality of Experience score.

6. The network system of claim 5, wherein the Quality of Experience score is determined based one at least one of: Mean Opinion Score (MOS) standard, latency, jitter and loss.

7. The network system of claim 1, wherein the data collection utility is configured to collect at least one of: Simple Network Management Protocol (SNMP) data, Netflow data, IP traffic data, on-device statistics from the client site network component, on-device statistics from the network server component, device configuration data, and log data.

8. The network system of claim 1, wherein the client site network component and the network server component are configured to interoperate to generate and maintain a network overlay for managing network communications between the first client site and the access point, wherein between the client site network component and the network server component data traffic is carried over the bonded/aggregated connection, and between the access point and the second client site the network server component terminates the bonded/aggregated connection and passes the data traffic to the high performing network.

9. The network system of claim 8, wherein the network configuration utility is configured to control the network overlay to reconfigure one or more network server components or one or more network paths.

10. The network system of claim 1, wherein the network configuration utility is configured to reconfigure a managed network path comprising the bonded/aggregated connection and at least one network path carried over the high performing network.

11. The network system of claim 1, wherein the network configuration utility is configured to store the collected network performance data in at least one electronic data store.

12. The network system of claim 1, wherein the network configuration utility is configured to automatically provision one or more network devices between the first client site and the second client site.

13. The network system of claim 1, wherein the network configuration utility is configured to automatically reconfigure the client site network component to:
  (a) collect the network performance data; and
  (b) initiate configuration of a network overlay to include one or more network server components to improve network performance.

14. The network system of claim 1, wherein the network configuration utility is configured to apply predictive analytics to facilitate the reconfiguration.

15. The network system of claim 14, wherein the predictive analytics comprise pattern recognition and machine learning techniques.

16. The network system of claim 15, wherein the network performance analysis utility automatically generates rules for responding to network performance issues.

17. The network system of claim 1, wherein the network performance analysis utility is configured to detect network attacks or network vulnerabilities.

18. A computer-implemented method for improving network communication performance between at least a first client site and a second client site, wherein the first client site and the second client site are at a distance from one another that would usually require long haul network communication, the method comprising:
  (a) configuring, by at least one client site network component that is implemented at least at the first client site, a bonded/aggregated connection by bonding or aggregating one or more diverse network connections, the at least one client site network component configured to interoperate with at least one network server component, the network server component including a server/concentrator that is implemented at an access point to a high performing network interconnected with the second client site;
  (b) collecting network performance data from a variety of sources or network points in real-time or near real-time by a data collection utility of a cloud based network manager;
  (c) dynamically analyzing the collected network performance data in real-time or near real-time by a network performance analysis utility of the cloud based network manager; and
  (d) reconfiguring at least one of: the at least one client site network component, the at least one network server component, the one or more diverse network connections, and the bonded/aggregated connection based on the analyzed network performance data by a network configuration utility of the cloud based network manager.

19. The computer-implemented method of claim 18, comprising displaying, by an electronic portal of the cloud based network manager, at least one of: the collected network performance data and an analysis output of the network performance analysis utility of the network system.

20. The computer-implemented method of claim 18, comprising generating, by the network performance analysis utility, data required to modify network paths in the high performing network between the first client site and the second client site.

21. The computer-implemented method of claim 20, comprising determining, by the network performance analysis utility, a network performance score based on the network performance data.

22. The computer-implemented method of claim 21, wherein the network performance score is a Quality of Experience score.

23. The computer-implemented method of claim 22, wherein the Quality of Experience score is determined based one at least one of: Mean Opinion Score (MOS) standard, latency, jitter and loss.

24. The computer-implemented method of claim 18, comprising collecting, by the data collection utility, at least one of: Simple Network Management Protocol (SNMP) data, Netflow data, IP traffic data, on-device statistics from the client site network component, on-device statistics from the network server component, device configuration data, and log data.

25. The computer-implemented method of claim 18, wherein the client site network component and the network server component are configured to interoperate to generate and maintain a network overlay for managing network communications between the first client site and the access point, wherein between the client site network component and the network server component data traffic is carried over the bonded/aggregated connection, and between the access point and the second client site the network server component terminates the bonded/aggregated connection and passes the data traffic to the high performing network.

26. The computer-implemented method of claim 25, comprising controlling, by the network configuration utility, the network overlay to reconfigure one or more network server components or one or more network paths.

27. The computer-implemented method of claim 18, comprising reconfiguring, by the network configuration utility, a managed network path comprising the bonded/aggregated connection and at least one network path carried over the high performing network.

28. The computer-implemented method of claim 18, comprising storing, by the data collection utility, the collected network performance data in at least one electronic data store.

29. The computer-implemented method of claim 18, comprising automatically provisioning, by the network configuration utility, one or more network devices between the first client site and the second client site.

30. The computer-implemented method of claim 18, comprising automatically reconfiguring, by the network configuration utility, the client site network component to:
  (a) collect the network performance data; and
  (b) initiate configuration of a network overlay to include one or more network server components to improve network performance.

31. The computer-implemented method of claim 18, comprising applying, by the network configuration utility, predictive analytics to facilitate the reconfiguration.

32. The computer-implemented method of claim 31, wherein the predictive analytics comprise pattern recognition and machine learning techniques.

33. The computer-implemented method of claim 32, comprising automatically generating rules for responding to network performance issues by the network performance analysis utility.

34. The computer-implemented method of claim 18, comprising detecting network attacks or network vulnerabilities by the network performance analysis utility.

* * * * *